US012200075B2

(12) United States Patent
Parra et al.

(10) Patent No.: US 12,200,075 B2
(45) Date of Patent: Jan. 14, 2025

(54) METHOD FOR ASSESSMENT OF HUMAN ATTENTION

(71) Applicant: IPPM Venture, LLC, Brooklyn, NY (US)

(72) Inventors: Lucas C. Parra, Brooklyn, NY (US); Jens Madsen, New York, NY (US)

(73) Assignee: IPPM Venture, LLC, Brooklyn, NY (US)

( * ) Notice: Subject to any disclaimer, the term of this patent is extended or adjusted under 35 U.S.C. 154(b) by 200 days.

(21) Appl. No.: 17/450,415

(22) Filed: Oct. 8, 2021

(65) Prior Publication Data

US 2022/0030080 A1    Jan. 27, 2022

Related U.S. Application Data

(63) Continuation-in-part of application No. PCT/US2020/027605, filed on Apr. 10, 2020.
(60) Provisional application No. 63/219,610, filed on Jul. 8, 2021, provisional application No. 62/879,765, filed on Jul. 29, 2019, provisional application No. 62/831,902, filed on Apr. 10, 2019.

(51) Int. Cl.
| | | |
|---|---|---|
| H04N 7/16 | (2011.01) | |
| A63F 13/45 | (2014.01) | |
| A63F 13/60 | (2014.01) | |
| G06F 3/01 | (2006.01) | |
| H04H 60/33 | (2008.01) | |
| H04L 67/50 | (2022.01) | |

(52) U.S. Cl.
CPC ............ *H04L 67/535* (2022.05); *A63F 13/45* (2014.09); *A63F 13/60* (2014.09); *G06F 3/012* (2013.01); *G06F 3/013* (2013.01)

(58) Field of Classification Search
CPC .......... H04N 21/252; H04N 21/44204; H04N 21/44218; G06F 3/012; G06F 3/013; H04L 67/06
See application file for complete search history.

(56) References Cited

U.S. PATENT DOCUMENTS

| | | |
|---|---|---|
| 5,243,517 A | 9/1993 | Schmidt et al. |
| 5,676,138 A | 10/1997 | Zawilinski |
| 6,099,319 A | 8/2000 | Zaltman et al. |
| 6,102,873 A | 8/2000 | Claessens |

(Continued)

FOREIGN PATENT DOCUMENTS

| | | |
|---|---|---|
| WO | WO 2010/105034 | 9/2010 |
| WO | WO 2011/031932 | 3/2011 |
| WO | WO 2017/152215 | 9/2017 |

OTHER PUBLICATIONS

Bergt, A., et al., "Reading memory formation from the eyes," Wiley, European Journal of Neuroscience, DOI: 10.1111/ejn.13984, dated May 2018.

(Continued)

*Primary Examiner* — Gigi L Dubasky
(74) *Attorney, Agent, or Firm* — Vista IP Law Group, LLP

(57) ABSTRACT

A method to assess a human subject's attention while experiencing dynamic media. An attention-predictive response (e.g. time course of gaze position, or pupil size, or heart-rate, etc.) is monitored while the subject watches the media. Similarity of the time course of this response to the time course of a predicted response provides a quantitative measure of the subject's attention to the media.

27 Claims, 14 Drawing Sheets

(56) References Cited

U.S. PATENT DOCUMENTS

| | | | |
|---|---|---|---|
| 6,228,038 B1 | 5/2001 | Claessens | |
| 6,585,521 B1 | 7/2003 | Obrador | |
| 9,179,858 B2 | 11/2015 | Hasson et al. | |
| 9,867,576 B2 | 1/2018 | Hasson et al. | |
| 2010/0004977 A1* | 1/2010 | Marci | H04N 21/44218 705/7.32 |
| 2011/0161011 A1* | 6/2011 | Hasson | A61B 5/0042 702/19 |
| 2012/0215903 A1* | 8/2012 | Fleischman | G06Q 50/01 709/224 |
| 2014/0214335 A1* | 7/2014 | Siefert | A61B 5/0205 702/19 |
| 2016/0366203 A1 | 12/2016 | Blong et al. | |
| 2017/0293356 A1* | 10/2017 | Khaderi | G02B 27/0172 |
| 2017/0295404 A1* | 10/2017 | Meredith | H04N 21/252 |
| 2020/0296458 A1* | 9/2020 | Chappell, III | A61B 5/163 |

OTHER PUBLICATIONS

Bevilacqua, D., et al., "Brain-to-Brain Synchrony and Learning Outcomes Vary by Student-Teacher Dynamics: Evidence from a Real-world Classroom Electroencephalography Study," Journal of Cognitive Neuroscience 31:3, pp. 401-411, copyright 2018.

Bradley, M., et al., "The pupil as a measure of emotional arousal and autonomic activation," Psychophysiology, 45 (2008), 602-607. Wiley Periodicals, Inc. Printed in the USA. Copyright 2008, Society for Psychophysiological Research, DOI: 10.1111/j.1469-8986.2008.00654.x.

Bucher, H., et al., "The relevance of attention for selecting news content. An eye-tracking study on attention patterns in the reception of print and online media," Communications 31 (2006), dated 2006.

Bunce, D., et al., "How Long Can Students Pay Attention in Class? A Study of Student Attention Decline Using Clickers," Journal of Chemical Education, vol. 87 No. 12 Dec. 2010.

Burleson-Lesser, K., et al., "Collective Behaviour in Video Viewing: A Thermodynamic Analysis of Gaze Position," Ghent University, Belgium, dated Jan. 2017.

Chen, S., et al., "Eye movements predict students' computer-based assessment performance of physics concepts in different presentation modalities," Computers & Education 74 (2014) 61-72, dated 2014.

Christoforou, C., et al., "From the eyes and the heart: a novel eye-gaze metric that predicts video preferences of a large audience," Frontiers in Psychology, dated May 1, 2015|vol. 6|Article579.

Cohen, S., et al., "Engaging narratives evoke similar neural activity and lead to similar time perception," Scientific Reports, dated Jul. 4, 2017.

Cohen, S., et al., "Neural engagement with online educational videos predicts learning performance for individual students," Neurobiology of Learning and Memory 155 (2018) 60-64, dated 2018.

Deubel, H., et al., "Saccade Target Selection and Object Recognition: Evidence for a Common Attentional Mechanism," Vision Res., vol. 36, No. 12, pp. 1827-1837, 1996 Copyright © 1996 Elsevier Science Ltd.

Dikker, S., et al., "Brain-to-Brain Synchrony Tracks Real-World Dynamic Group Interactions in the Classroom," Current Biology 27, 1375-1380 May 8, 2017.

Dmochowski, J., et al., "Correlated components of ongoing EEG point to emotionally laden attention—a possible marker of engagement?" Frontiers in Human Neuroscience, dated May 2012.

Dmochowski, J., et al., "Audience preferences are predicted by temporal reliability of neural processing," Nature Communications dated Jul. 2014.

Dorr, M., et al., "Variability of eye movements when viewing dynamic natural scenes," Journal of Vision (2010) 10(10):28, 1-17, dated 2010.

Franchak, J., et al., "Free Viewing Gaze Behavior in Infants and Adults," Infancy, 21(3), 262-287, dated 2016, Copyright © International Congress of Infant Studies (ICIS).

Freitas, S., et al., "Will MOOCs transform learning and teaching in higher education? Engagement and course retention in online learning provision," British Journal of Educational Technology vol. 46 No. 3 2015 455-471.

Ginda, M., et al., "Visualizing learner engagement, performance, and trajectories to evaluate and optimize online course design," dated May 2019.

Hasson, I., et al., "Intersubject Synchronization of Cortical Activity During Natural Vision," Mar. 12, 2004 vol. 303 Science.

Hasson, U., et al., "Neurocinematics: The Neuroscience of Film," Projections vol. 2, Issue 1, Summer 2008: 1-26 © Berghahn Journals.

Hasson, U., et al., "Enhanced Intersubject Correlations during Movie Viewing Correlate with Successful Episodic Encoding," Neuron 57, 452-462, Feb. 7, 2008, copyright 2008 Elsevier Inc.

Hoffman, J., et al., "The role of visual attention in saccadic eye movements," Perception & Psychophysics, dated 1995, 57 (6), 787-795.

Itti, L., et al., "Bayesian surprise attracts human attention," Vision Research 49 (2009) 1295-1306, dated 2009.

Jarodzka, H., et al., "In the eyes of the beholder: How experts and novices interpret dynamic stimuli," Learning and Instruction 20 (2010) 146e154.

Ki, J., et al., "Attention Strongly Modulates Reliability of Neural Responses to Naturalistic Narrative Stimuli," The Journal of Neuroscience, Mar. 9, 2016 • 36(10):3092-3101.

Lagun, D, et al., "Understanding and Measuring User Engagement and Attention in Online News Reading," WSDM'16, Feb. 22-25, 2016, San Francisco, CA, USA.

Lai, M., et al., "A review of using eye-tracking technology in exploring learning from 2000 to 2012," Educational Research Review 10 (2013) 90-115, dated 2013.

Loftus, G., "Eye Fixations and Recognition Memory for Pictures," Cognitive Psychology 3, 525-551, dated 1972.

Lorigo, L., et al., "Eye Tracking and Online Search: Lessons Learned and Challenges Ahead," Journal of the American Society for Information Science and Technology, 59(7):1041-1052, dated 2008.

Meur, O., et al., "Overt visual attention for free-viewing and quality assessment tasks Impact of the regions of interest on a video quality metric," Signal Processing: Image Communication 25 (2010)547-558, dated 2010.

Packard, R., "The Control of "Classroom Attention": a Group Contingency for Complex Behavior," Journal of Applied Behavior Analysis, 1970, 3, 13-28 No. I (Spring 1970).

Piquado, T., et al., "Pupillometry as a measure of cognitive effort in younger and older adults," Psychophysiology, 47 (2010), 560-569. Wiley Periodicals, Inc.

Poulsen, A., et al., "EEG in the classroom: Synchronised neural recordings during video Presentation," Scientific Reports, dated Mar. 2017.

Rayner, K., "The 35th Sir Frederick Bartlett Lecture: Eye movements and attention in reading, scene perception, and visual search," The Quarterly Journal of Experimental Psychology, dated 2009, 62 (8), 1457-1506.

Slykhuis, D., et al., "Eye-Tracking Students' Attention to PowerPoint Photographs in a Science Education Setting," Journal of Science Education and Technology, vol. 14, Nos. 5/6, Dec. 2005 (Copyright 2005).

Smith, T., et al., "Attentional synchrony and the influence of viewing task on gaze behavior in static and dynamic scenes," Journal of Vision (2013) 13(8): 16, 1-24.

van Gog, T., et al., "Attention guidance during example study via the model's eye movements," Computers in Human Behavior 25 (2009) 785-791, dated 2009.

Wang, H., et al., "Temporal eye movement strategies during naturalistic Viewing," Journal of Vision (2012) 12(1):16, 1-27, dayed 2012.

Yang, F., et al., "Tracking learners' visual attention during a multimedia presentation in a real classroom," Computers & Education 62 (2013) 208-220, dated 2013.

(56) References Cited

OTHER PUBLICATIONS

PCT International Search Report and Written Opinion for International Appln. No. PCT/US2020/27605 dated Jan. 5, 2021.

* cited by examiner

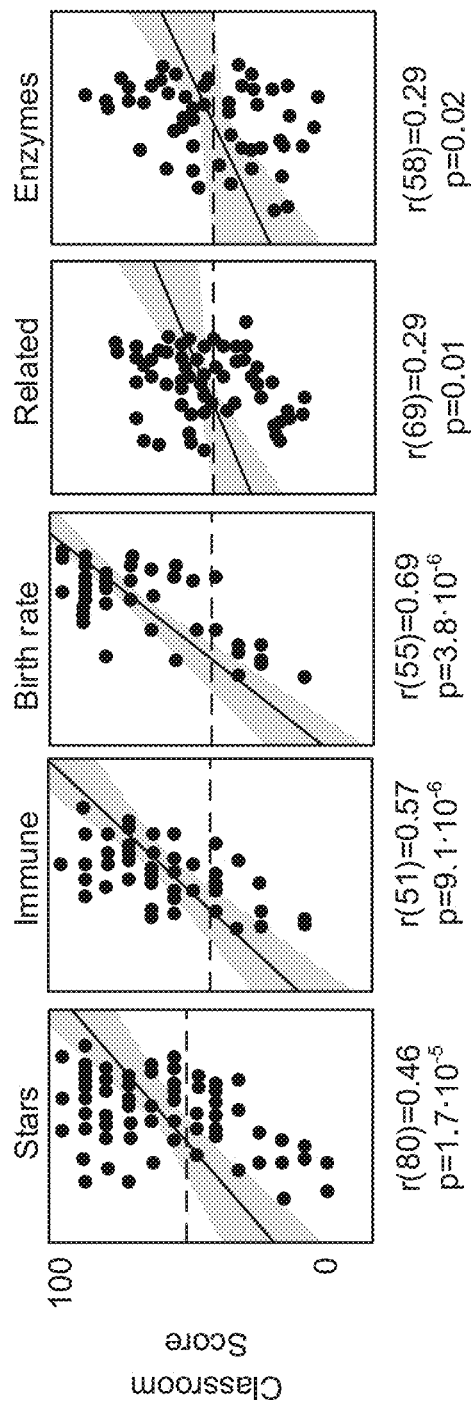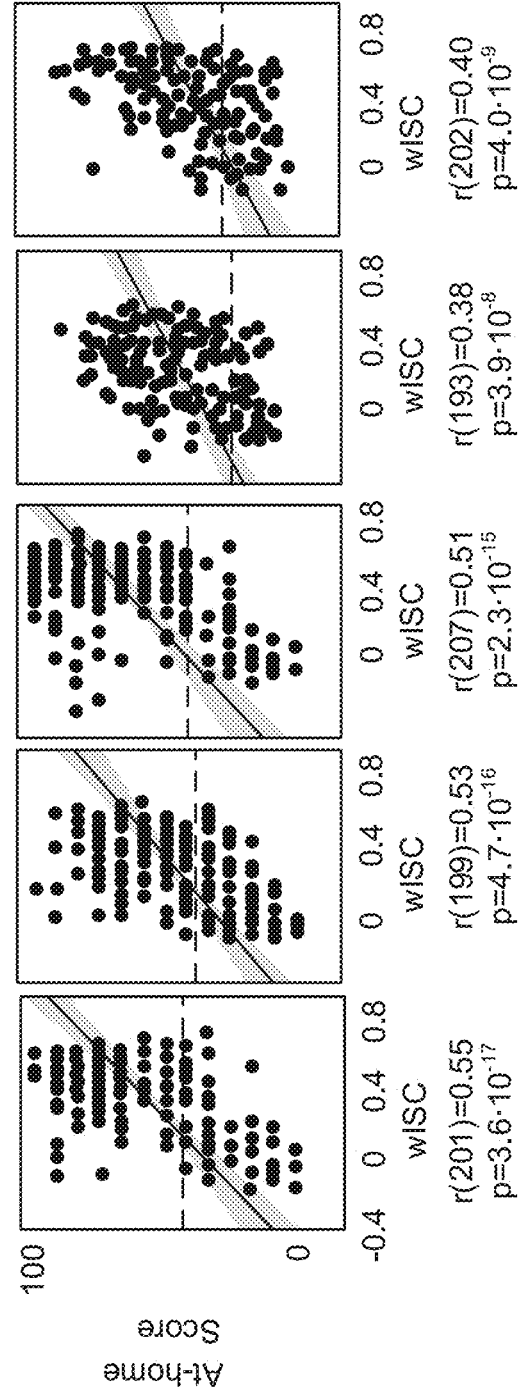
FIG. 5C
FIG. 5D

METHOD FOR ASSESSMENT OF HUMAN ATTENTION

RELATED APPLICATION DATA

This application is a continuation-in-part of International Patent Application No. PCT/US2020/027605, filed on Apr. 10, 2020, which claims priority to U.S. Provisional Patent Application No. 62/831,902 filed on Apr. 10, 2019, lapsed, and U.S. Provisional Patent Application No. 62/879,765 filed on Jul. 29, 2019, lapsed. This application also claims priority to, and the benefit of, U.S. Provisional Patent Application No. 63/219,610 filed on Jul. 8, 2021. All of the above-identified applications are expressly incorporated by reference herein.

STATEMENT OF FEDERALLY SPONSORED RESEARCH OR DEVELOPMENT

This invention was made with Government support under grant number DRL-1660548 awarded by the National Science Foundation. The government has certain rights in the invention.

FIELD

The field relates to method for assessment of audience attention.

BACKGROUND

Audience attention is an important commodity given the abundance of electronic media today. Many producers of media (e.g. movies, advertisements, broadcast events, online concerts, online exercise classes, online learning) are financially motivated to monitor the attention of their audience. Unfortunately, no single solution has proven to be entirely satisfactory. Most prior approached to monitor attention have relied on comparing eye gaze position with the item of interest. For example, is the eye gaze of a driver directed at the road? Is the eye gaze of a computer user directed as the computer monitor? Is the eye gaze directed at a specific advertising on the screen? However, in many scenarios the user/viewer is directly looking at the screen, but their mind is still not attentively engaged with the content. In particular with dynamic content such as video, it may not be obvious where the user should be looking to determine if they are paying attention. To really determine if the mind is engaged would require to monitor brain activity. This has been done successfully using electroencephalography, among other brain imaging methods. However, recording brain activity is not practical in many scenarios. This limits the applications to studies that can be performed on a small group, perhaps in a testing laboratory. Many prior approaches cannot be performed on large groups of individuals, cannot be performed remotely, and require costly equipment and sophisticated data analysis methods. Additionally, many prior approaches do not safeguard the privacy of the individuals. An improved solution is therefore desired.

The discussion above is merely provided for general background information and is not intended to be used as an aid in determining the scope of the claimed subject matter.

SUMMARY

This disclosure provides a method to assess a human subject's attention while experiencing dynamic media. An attention-predictive response (e.g. time course of gaze position, or pupil size, or heart-rate, etc.) is monitored while the subject watches the media. Similarity of the time course of this response to the time course of a predicted response provides a quantitative measure of the subject's attention to the media.

In a first embodiment, a method to assess a human subject's attention is provided. The method comprising steps of: playing a pre-record dynamic media to a plurality of human subjects; digitally recording at least one attention-predictive response of each human subject in the plurality of human subjects dynamically over time during the step of playing, thereby producing a digitally recorded attention-predictive response for each human subject; and quantifying, for each human subject in the plurality of human subjects, a similarity over time of the digitally recorded attention-predictive response to a corresponding anticipated response to the pre-recorded dynamic media.

In a second embodiment, a method to assess a human subject's attention is provided. The method comprising steps of: digitally recording, dynamically in real-time, at least one attention-predictive response of each human subject in a plurality of human subjects while the human subjects are experiencing a real-time dynamic media that is being broadcast by a broadcaster, thereby producing a digitally recorded attention-predictive response for each human subject; and quantifying, for each human subject in the plurality of human subjects, a similarity over time of the digitally recorded attention-predictive response to a corresponding anticipated response to the dynamic media.

In a third embodiment, a method of adjusting a video game in response to player attention is provided. The method comprising: generating a dynamic video display that is produced during play of a video game, wherein the dynamic video display has an anticipated response with regard to an attention-predictive response of a human subject; digitally recording, dynamically in real-time, at least one attention-predictive response of the human subject dynamically over time while the human subject is experiencing the dynamic video display, thereby producing a digitally recorded attention-predictive response; quantifying a similarity over time of the digitally recorded attention-predictive response to a corresponding anticipated response to the dynamic video display; and adjusting the video game in response to changes in the similarity over time.

A method to assess human attention, includes: providing a dynamic media for presentation to a human subject; obtaining a digitally recorded time course of attention-predictive response for the human subject, wherein the digitally recorded time course of the attention-predictive response is a digital recording of the attention-predictive response of the human subject over time while the dynamic media is being presented; and determining a similarity metric indicating a similarity between (1) the digitally recorded time course of the attention-predictive response and (2) a corresponding time course of anticipated response to the dynamic media.

Optionally, the corresponding time course of the anticipated response to the dynamic media is determined by a computer model.

Optionally, the corresponding time course of the anticipated response to the dynamic media is determined by aggregating responses of human test subjects to the dynamic media.

Optionally, the corresponding time course of the anticipated response is an anonymous aggregate of the responses of the human test subjects.

Optionally, the human subject is remote, and the dynamic media is presented over a computer network.

Optionally, the attention-predictive response is cursor movement on a computer that is presenting the dynamic media.

Optionally, the attention-predictive response comprises gaze-position, eye movement velocity, pupil size, head movement, hand movement, facial expression, a heart rate, or a combination of two or more of the foregoing.

Optionally, the attention-predictive response comprises both gaze-position and eye movement velocity.

Optionally, the attention-predictive response is recorded using a digital recording device attached to the human subject.

Optionally, the attention-predictive response comprises heart rate, breathing effort, galvanic skin response, or a combination of two or more of the foregoing.

Optionally, the dynamic media comprises a pre-recorded dynamic media.

Optionally, the dynamic media comprises a real-time dynamic media that is broadcast by a broadcaster.

Optionally, the method further includes determining an additional similarity metric indicating a similarity between (1) an additional digitally recorded time course of attention-predictive response of an additional human subject and (2) the corresponding time course of anticipated response to the dynamic media Optionally, the method further includes averaging the similarity metric and the additional similarity metric to obtain an attention score for the human subjects.

Optionally, the corresponding time course of the anticipated response to the dynamic media comprises a median response of a group of human test subjects.

Optionally, the dynamic media comprises a dynamic video of a video game, and wherein the method further comprises adjusting the video game based on the similarity metric.

Optionally, the corresponding time course of anticipated response is based on responses of other human subjects to which the dynamic media is presented.

Optionally, the similarity metric indicates a degree of pattern matching between (1) the digitally recorded time course of the attention-predictive response and (2) the corresponding time course of anticipated response to the dynamic media.

Optionally, the attention-predictive response indicates saccade rate.

Optionally, the attention-predictive response indicates blink rate.

In some cases, the above method or any of the features of the method may be implemented using hardware, software, or a combination of both.

An electronic system to assess human attention includes a processing unit configured to provide a dynamic media for presentation to a human subject; electronically obtain a digitally recorded time course of attention-predictive response for the human subject, wherein the digitally recorded time course of the attention-predictive response is a digital recording of the attention-predictive response of the human subject over time while the dynamic media is being presented; and determine a similarity metric indicating a similarity between (1) the digitally recorded time course of the attention-predictive response and (2) a corresponding time course of anticipated response to the dynamic media.

Optionally, the processing unit is configured to determine the corresponding time course of the anticipated response to the dynamic media by using a computer model.

Optionally, the processing unit is configured to determine the corresponding time course of the anticipated response to the dynamic media by aggregating responses of human test subjects to the dynamic media.

Optionally, in the processing system, the corresponding time course of the anticipated response is an anonymous aggregate of the responses of the human test subjects.

Optionally, the human subject is remote, and the system is configured to present the dynamic media over a computer network.

Optionally, in the system, the attention-predictive response is cursor movement on a computer that is presenting the dynamic media.

Optionally, in the system, the attention-predictive response comprises gaze-position, eye movement velocity, pupil size, head movement, hand movement, facial expression, a heart rate, or a combination of two or more of the foregoing.

Optionally, in the system, the attention-predictive response comprises both gaze-position and eye movement velocity.

Optionally, the processing unit is configured to obtain the digitally recorded time course of the attention-predictive response from a digital recording device that is configured to be attached to the human subject.

Optionally, in the system, the attention-predictive response comprises heart rate, breathing effort, galvanic skin response, or a combination of two or more of the foregoing.

Optionally, in the system, the dynamic media comprises a pre-recorded dynamic media.

Optionally, in the system, the dynamic media comprises a real-time dynamic media that is broadcast by a broadcaster.

Optionally, the processing unit is further configured to determine an additional similarity metric indicating a similarity between (1) an additional digitally recorded time course of attention-predictive response of an additional human subject and (2) the corresponding time course of anticipated response to the dynamic media Optionally, the processing unit is configured to average the similarity metric and the additional similarity metric to obtain an attention score for the human subjects.

Optionally, in the system, the corresponding time course of the anticipated response to the dynamic media comprises a median response of a group of human test subjects.

Optionally, in the system, the dynamic media comprises a dynamic video of a video game, and wherein the system is configured to adjust the video game based on the similarity metric.

Optionally, in the system, the corresponding time course of anticipated response is based on responses of other human subjects to which the dynamic media is presented.

Optionally, in the system, the similarity metric indicates a degree of pattern matching between (1) the digitally recorded time course of the attention-predictive response and (2) the corresponding time course of anticipated response to the dynamic media.

Optionally, in the system, the attention-predictive response indicates saccade rate.

Optionally, in the system, the attention-predictive response indicates blink rate.

A processor-readable non-transitory medium storing a set of instructions, an execution of which will cause a method to assess human attention to be performed, the method including: providing a dynamic media for presentation to a human subject; obtaining a digitally recorded time course of attention-predictive response for the human subject, wherein the digitally recorded time course of the attention-predictive response is a digital recording of the attention-predictive response of the human subject over time while the dynamic media is being presented; and determining a similarity metric indicating a similarity between (1) the digitally recorded time course of the attention-predictive response and (2) a corresponding time course of anticipated response to the dynamic media.

This brief description is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

FIG. 5C are graphs showing weighted average of the vertical, horizontal and velocity ISC eye-movement (wISC) is predictive of performance in the Classroom.

FIG. 5D are graphs showing Eye-movement wISC is predictive of performance in the At-home setting.

DESCRIPTION OF THE EMBODIMENTS

Figure 1:
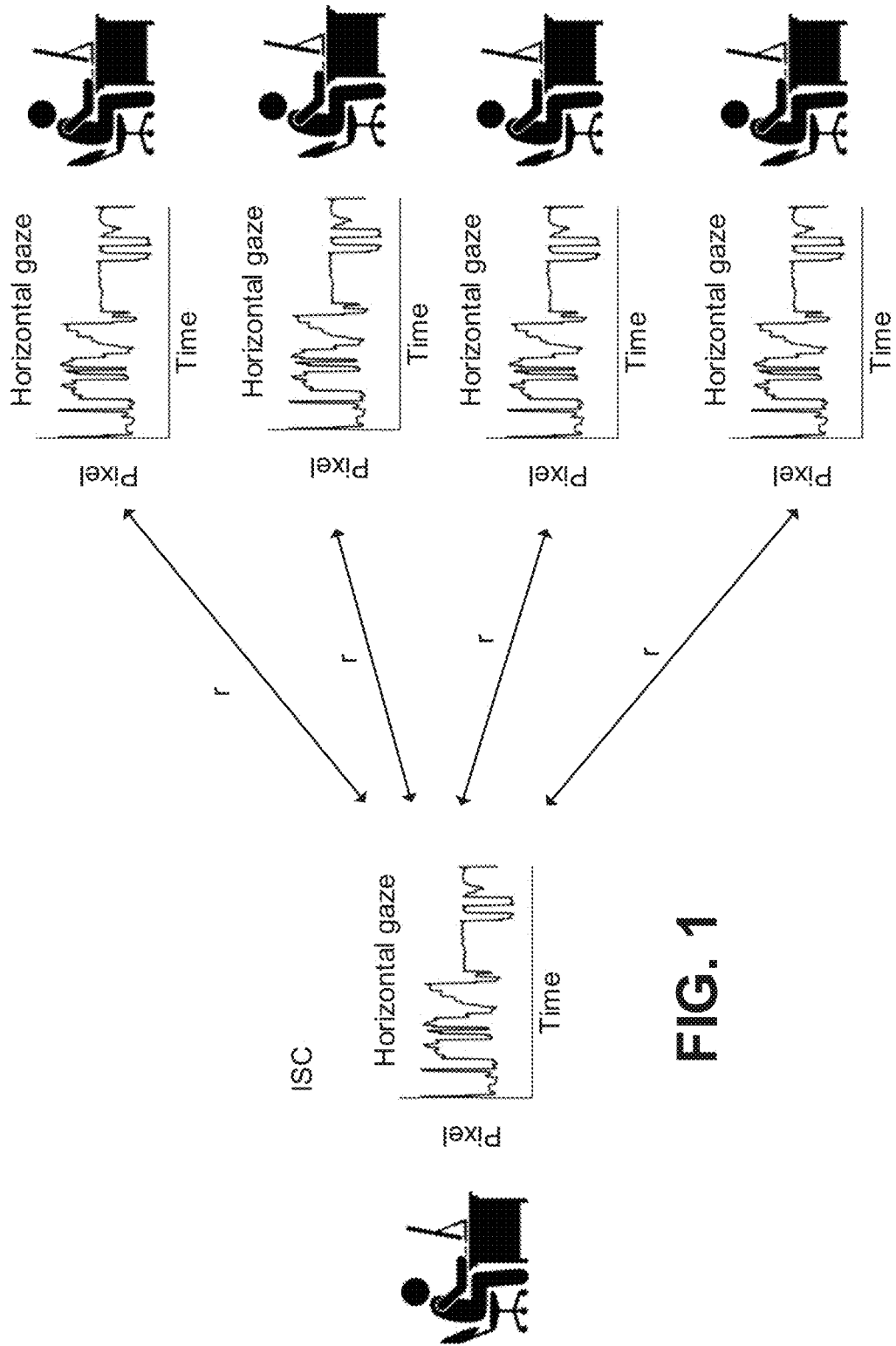
FIG. 1 is a schematic depiction of an embodiment that shows similarity of response is determined by correlating the time course of eye-gaze position with that of an attentive group. Correlation of eye movements is computed between each pair of subjects as n and then averaged over all pairs to deliver a single measure of inter-subject-correlation: ISC=1/N$\Sigma r_i$, where i=1 . . . N.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

The present disclosure details how to assess audience attention unobtrusively and remotely for dynamic media such as video (including movies, online courses and video games) and audio (including music, podcasts and audio books). Attention may be measured on either a group or an individual level. The disclosed method scales to large number of individuals and can be readily automated. This disclosure shows the effectiveness of measuring attention from the predictability of behavioral or physiological responses such as eye-movements, pupil dilation and/or heart rate. Such signals can be readily collected remotely. The disclosure further teaches how to adapt the dynamic media or the interaction to capture attention of an audience.

Figure 2:
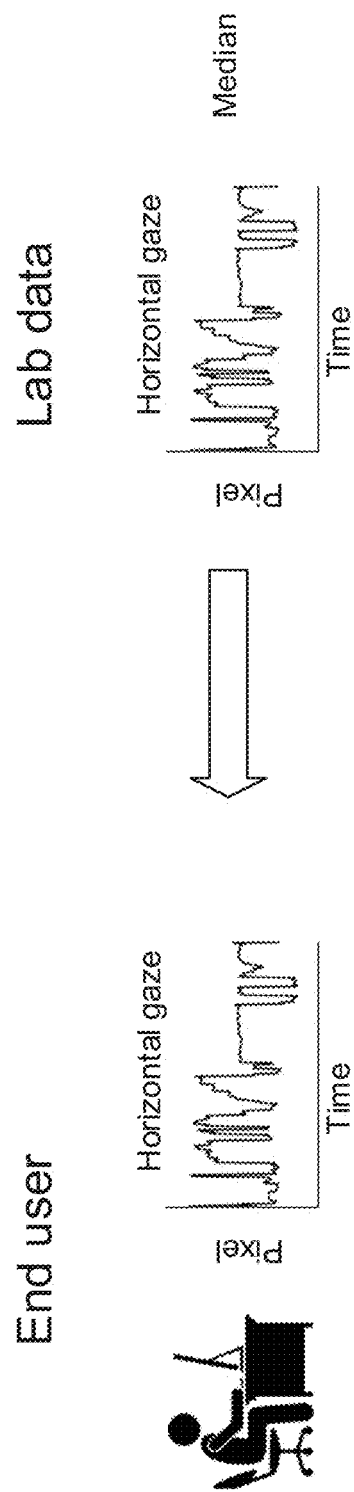
FIG. 2 is a schematic depiction of an embodiment that shows similarity of response is determined by first aggregating the time course of eye-gaze position across a test group. In this case, the time course is the median eye-gaze position in the group at each instant in time. Similarity is them determined by correlating the individual user eye-gaze position with this anonymous aggregated group response. When reference response is predicted by some other means, e.g. a computational model, then the correlation is no longer a intersubject correlation, but a correlation between subjects and a computer predicted response.

In one embodiment, an audience is exposed to a dynamic media and audience response over time is digitally recorded (i.e., dynamically recorded). The recorded response is compared to a predicted response over time in a group of viewers (FIG. 1). Predictability is established based on reference responses which can be determined by aggregates of other individuals' responses to the dynamic media, or by predicting the responses to the dynamic media using computational models of responses. The level of attention (a continuous variable) can be measured as the similarity of the observed audience response over time to that of the predicted response. In one embodiment similarity is measured as the temporal correlation of the time course of the observed audience response with the time course of the predicted reference response (FIG. 2).

To establish the predicted response in the case of eye-gaze position one can use for example models of visual salience. There are existing software programs for establishing the salience of images or video. Salience refers to the visual characteristics that make a point "salient" in an image, which, by definition means that they attract attention. These computer models for salience therefore aims to predict gaze position on an image or video. These salience models may be used to generate a predicted response for the temporal trajectory of gaze position. This is in particular important when trying to determine attention in video game. For a video game one typically cannot record data from a reference group to establish what the predicted response should be. This is simply because most video games progress differently every time they are played. In this case a computer model of visual salience may be utilized to predict the viewer eye-gaze response based on salience of the visual content of the video game. If a gamer is not following the visual content as expected, then this user is likely not properly attending to the game.

In a different embodiment, the predicted response is established by recording the responses over time in a reference group of subjects. If the response of a given test subject is similar to the response of all the members in the group, then this subject is coincided attentive. In such an embodiment, there is no need to have a single predicted response. Instead, the responses of the test subjects can be dynamically collected and compared to all members of the reference group.

Figure 3A:
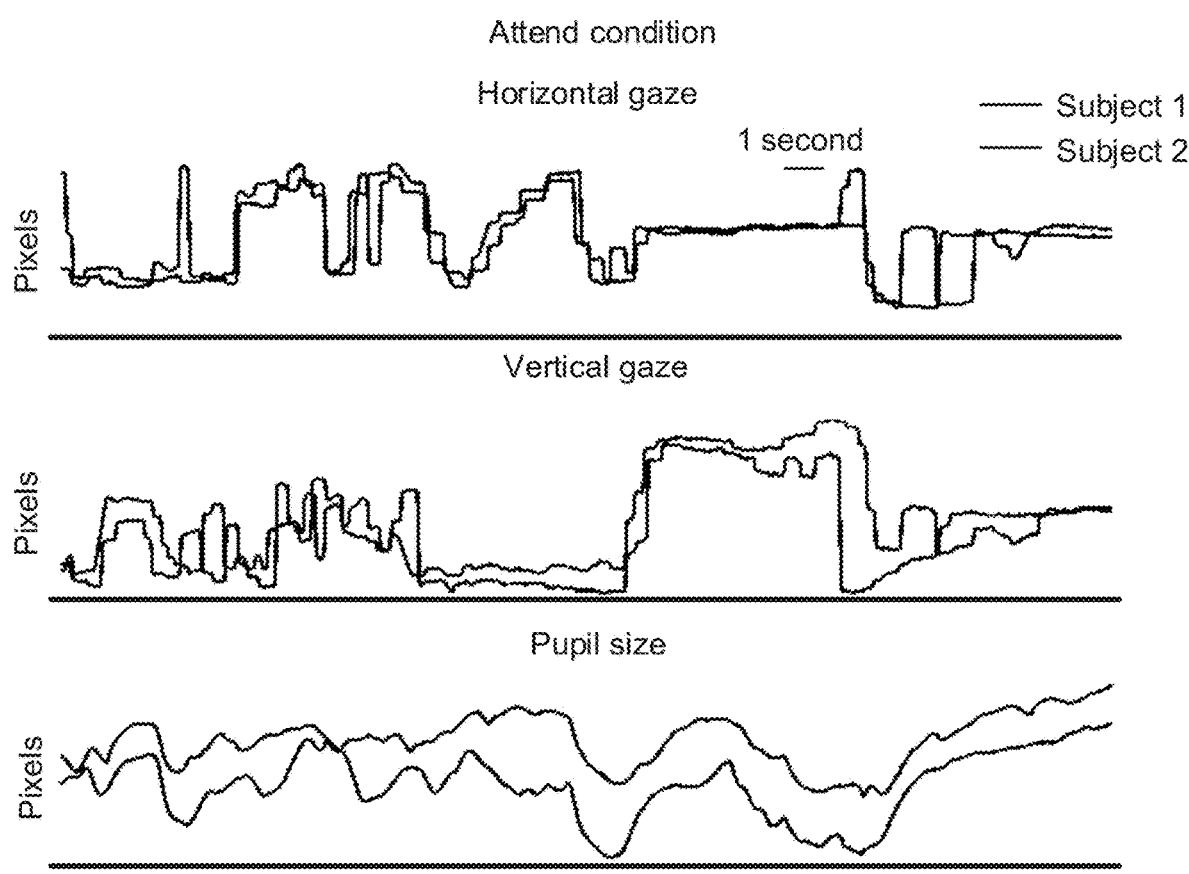
FIG. 3A is a graph showing two subjects' gaze position and pupil size follow each other during attentive viewing.

Responses can include a variety of behavioral or physiological responses that are predictable in attentive individuals. In this specification these responses are referred to as attention-predictive responses. Examples of behavioral responses include head movements, hand movements, eye movement (e.g. time course of gaze-position, FIG. 3A and FIG. 3B for attentive and distracted subjects respectively), pupil size (FIG. 3A and FIG. 3B), eye movement velocity, facial expression and computer mouse movements (e.g. computer cursor movements). Examples of physiological responses include pupil dilation, heart rate, breathing effort (e.g. thorax diameter, etc.), galvanic skin response, etc. The physiological responses can be recorded using conventional smart devices such as smart watches, arm bands, etc. It should be noted that the physiological responses are not limited to the examples described, and that the method may utilize other physiological response(s). For example, in other embodiments, the physiological response may be any physiological behavior or feature, such as saccade, blinking, etc., and may or may not necessarily be a "response" per se to a stimuli. In some cases, the recorded physiological response may indicate saccade rate and/or blink rate.

In one embodiment, at least one of the attention-predictive response is captured unobtrusively and transmitted remotely over the internet, such as with a web camera, wrist band, smartwatch, earwear, smart glasses, motion sensor, or other unobtrusive method to remotely capture such responses. As used in this specification, the term "remote" refers to the subjects being physically distanced from one another such that the subjects cannot physically interact without the use of a device (e.g., internet, wifi, wireless, computer, etc.).

In another embodiment, which preserves privacy, the response is recorded ahead of time in a reference audience and then aggregated across the reference group, e.g., as the median response. This response is now anonymous as it is not associated with any specific individual and is transmitted remotely to the user to assess the individual level of attention while preserving privacy.

In one embodiment, similarity of attention-predictive responses to a reference response is measured with correlation in time of the time courses of the different response (FIG. 1 and FIG. 2). If the reference response is the response of other subjects, this results in inter-subject correlation (ISC). However, in a different embodiment, the reference response may be computer generated using a predictive model of behavioral/physiological responses to the media. In that case, temporal correlation would be measured between subjects and computer models, and thus no longer represent an inter-subject correlation. Similarity could also be measured with other distance metrics that capture the time course of the response, such as euclidean distance averaged over time, or correlation of the time course after band-pass filtering to emphasize the fluctuations that are particularly relevant. For example, when measuring similarity of the time course of gaze position correlation of gaze position velocity has been used, which is a filtered version of gaze position. One may allow for mismatch with regard to when, exactly, viewers look at a particular point by smoothing the signal in time prior to measuring distance. This is again a similarity measure on a filtered version of the signal. There are a variety of additional measure in the existing literature.

Asynchronous Media Broadcasting:

The predicted response for a given dynamic media that is asynchronously broadcast is a property of the media itself. Asynchronous means the material is experienced by subjects at time other than the time when the media was recorded. For instance, a prerecorded dynamic media may be experienced (e.g., viewed and/or listened to) by an audience of initial subjects which serves as an attentive reference group. One or more attention-predictive responses are aggregated across this attentive reference group to serve as the attention-predictive response. The responses are a function of time as the dynamic media is experienced. This aggregated data is then associated with the dynamic media itself. Upon subsequent viewing by an individual subject, the subject's attention-predictive responses are quantitatively compared to this aggregate to determine how similar the subject's response is to the attention-predictive response. In one embodiment, the degree of similarity to the attentive-predicted response can be reported for each viewer in an audience, or for the entire audience.

Figure 3B:
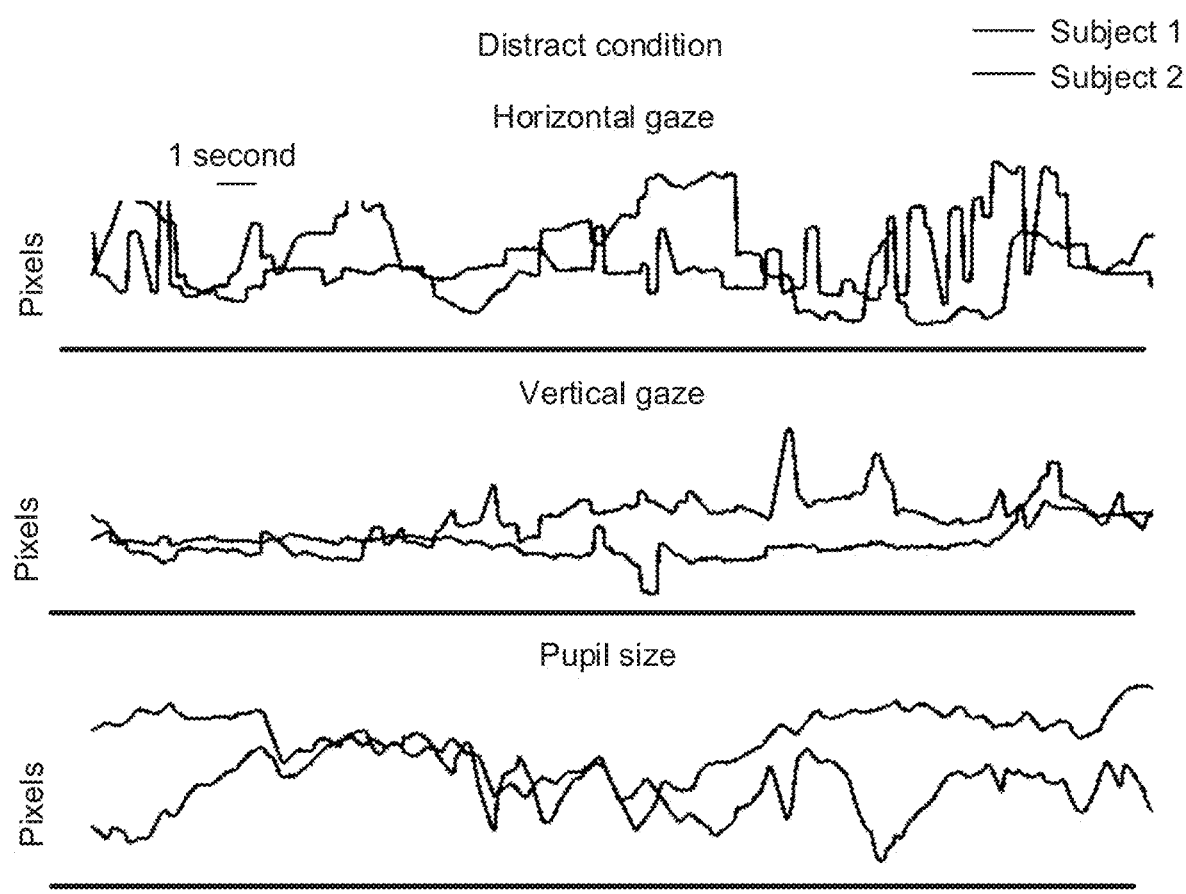
FIG. 3B is a graph showing the same two subjects viewing the same segment of video while distracted by a counting task.
Figure 3C:
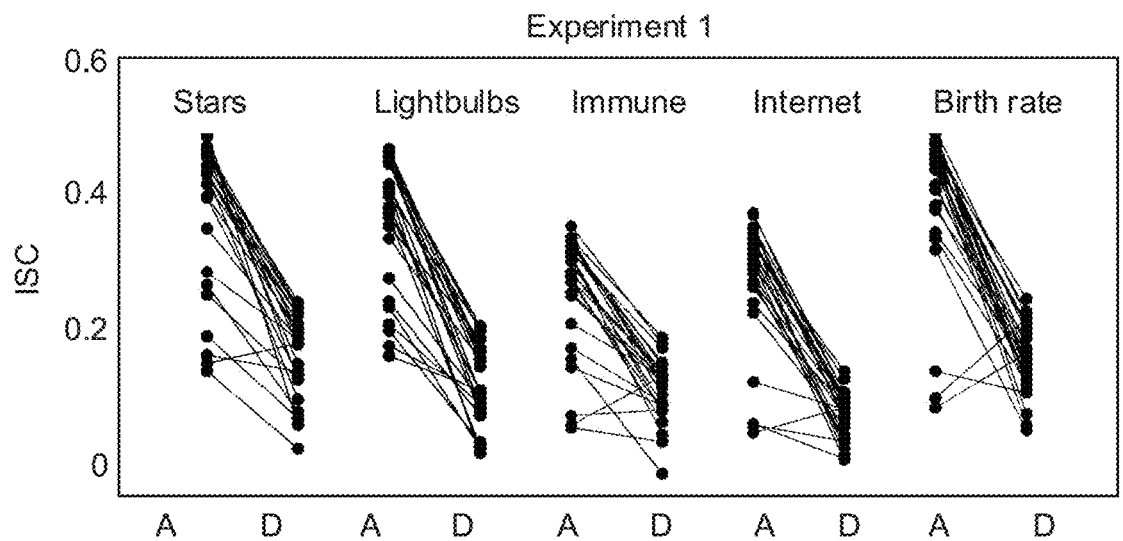
FIG. 3C is a graph showing the intersubject correlation (ISC) of eye movement measured as the mean of ISC of vertical and horizontal gaze position and pupil size. Values for each subject are shown as dots for all videos in Experiment 1. Each dot is connected with a line between two different conditions namely when subjects were either attending (A) or were distracted (D) while watching the video.
Figure 3D:
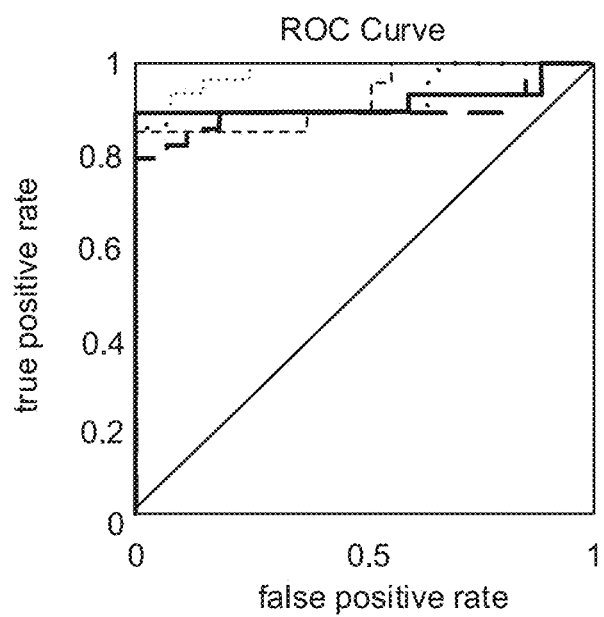
FIG. 3D depicts the receiver operator curve for deciding whether a subject is attending or distracted based on their ISC.

In one embodiment, a prerecorded dynamic media may be experienced (e.g., viewed and/or listened to) by an audience of initial subjects. The attention-predictive responses of the subjects are classified as either (1) attentive responses or (2) inattentive responses. In one embodiment this is done by measuring the similarity of the response to that of a reference group using inter-subject correlation (FIG. 1 and FIG. 2). Subjects in an attentive state show a high ISC value, which subjects in a dis-attentive state show low ISC values (FIG. 3C). By thresholding this ISC values subjects can be classified as attentive or distracted. The performance of this approach is demonstrated with the receiver-operator curve in FIG. 3D). This classification may the different at different points in time of the media. Attentive responses are generally correlated with one another. Conversely, inattentive responses are generally not correlated with one another. The aggregated data for the attentive responses may be used as the target data that is associated with the dynamic media. More generally, however, the level of attention is on a continuum and is not a binary state. One may therefore omit the step of threshold the similarity measure (e.g., ISC) and instead consider is as a continuum with moments of high similarity (high ISC) indicating a larger level of attention and moments of lower ISC indicating lower level of attention. Note that ISC levels in theory fall on a continuum between 0 and 1, with zero indicating no correlation (no similarity) and 1 indicating perfect correlation. In practice perfect correlation on behavioral and physiological time courses is never achieved. Indeed, the level of correlation varies for different types of responses. For instance, eye movement can achieve correlation values as high as 0.5 whereas inter-subject correlation of heart-rate often do not exceed 0.1. Therefore, there is no absolute threshold of similarity and one should evaluate the measure of similarity specifically for each type of response and each time of the media stimulus.

By way of illustration, a test audience may view a prerecorded movie, short television show, advertisement or short video. In one embodiment, a test audience for such an application includes at least 20 attentive viewers. During the viewing different audience members pay more less attention to different portions of the media. Those audience members who are attentive to the video have their attention-predictive responses correlated in time to one another (i.e. the time course of the responses are similar). Those audience members who are inattentive to the video have attention-predictive responses that are uncorrelated (the time courses of the responses are dissimilar). A television or movie producer can then determine how attentive of the audience was at different portions of the media (FIG. 3C). This aids in the producer making production or editing decisions. For example, if the audience is not found to be attentive to significant portions of a movie, then the movie may be edited before release. Conversely, if the audience is found to be attentive to the movie, then the movie may be commercially distributed to a wider audience.

By way of further illustration, an online video advertisement may be sent to a subject's browser or mobile device (e.g., smart phone or tablet). By monitoring the subject's attention-predictive responses the advertiser that determine whether or not the subject is paying attention to the advertisement.

By way of further illustration, and online education platform may be present an education video to a remote student. The platform mas assess the student's attention to the content of the video by determining the similarity of the student's attention-predictive responses to that of the reference responses. If the responses are dissimilar then the student is not attentive, and the education platform may choose to interrupt, or modify further presentation of the education content.

Synchronous Media Broadcasting:

Synchronous means the material is broadcast live with the subjects participating at time of broadcast. For synchronous broadcasts, attention-predictive responses can be aggregated across all live subjects (e.g., 20 or more subjects) to provide instantaneous feedback to the broadcaster indicating if the audience, at a whole, is paying attention. This will allow the broadcaster to pause when attention wanes, elaborate on concepts when subjects lose attention, or otherwise attempt to engage audience attention. One can measure attention, remotely and in real-time, by determining how predictable the attention-predictive responses are. In this case predictability is determined from comparing it to other subjects. If the attention-predictive responses of the audience are generally correlated then the broadcaster has captured the audience's attention. If the attention-predictive responses start to become less correlated then the broadcaster is beginning to lose the audience's attention. A digital signal may be generated to notify the broadcaster of this fact. The digit signal may be a digital signal that is sent to a computer program that is broadcasting the video (e.g., a computer program that is running a video game). In another embodiment, the digital signal may be a graphic or auditory alert that is perceptible by a human broadcaster. For example, when the ISC is below the 70th percentile typically observed in ISC values then the human broadcaster may hear a tone or see a graphic indicator (e.g., a yellow light). When the aggregated ISC is below the 40th percentile typically observed in ISC values then the broadcaster may hear a second tone or see a second graphic indicator (e.g., a red light). The similarity metric can be the correlation coefficient of the time course of the response with the time course of the predicted/anticipated response. This similarity metric can be reported as a percentile. For example, a given audience member may have a similarity to the reference that is in the 90th percentile of similarity in the group. This means this subject is particularly attentive. Another subject may have a similarity metric that is in the 20th percentile for the group. This subject is particularly inattentive. When a reference group is used to determine the predicted response, then the predicted response can be obtained, for example, as the median response over time. Then similarity is established for every subject in the reference group and thus a distribution of the similarity measure obtained. With this, one can determine percentile for other users in a new audience during asynchronous broadcast. This is similar to how percentiles are established in standardized tests. Test scores are determined on a reference group and then individual students obtain a percentile in their standardized test. Similarly, different media stimuli can be judged on the average percentile of similarity they achieve, as a metric of their efficacy in attracting attention.

In one embodiment, the method produces an output (e.g., table of numeric data, graphs, etc.) that summarize the attention levels of the group or of individuals within the group as a function of time. For example, the output may depict a graph or score of each individual's attention score (e.g., as a percentile) relative to the anticipated response. This graph or score is dynamic in that the values vary of time as the dynamic media is played. Such information is useful to determine which times in the media captured, or failed to capture, attention of at least some of the subjects.

For example, a commercial provider of media research could use the disclosed method to measure audience attention in real time. The service provided would enroll target audiences (not unlike traditional providers of such services as Nielsen Media Research). The provider would review behavioral or physiological response data in real time, and analyzing it for predictability, report an instantaneous measure of audience attention to their clients.

In another example, a synchronously broadcast exercise class may monitor attention-predictive responses such as body movements. If the attention-predictive responses of the audience are synchronized then the exercise class is going well. If the responses begin to become asynchronous then the instructor may need to take action to recapture the attention of the class. In another embodiment, online conferences can use a similar approach to increase attentiveness of the audience.

Another application of synchronous monitoring is to adaptively change the content. For instance, in video games, the content is often generated programmatically. The disclosed method can be used to adapt the content to capture maximum attention. For example, if eye movement cannot be predicted from the visual dynamic of the video game, the game program may choose to adapt parameters such as speed or difficulty of the game.

Yet another application is in online education. Lack of attention leads to a failure to learn the study material. At present online education has only limited ways to determine whether students are paying attention. For example, one can determine if students are clicking with a pointer on interactive user interfaces, or are playing a video on the online platform, but there is no way to determine if students are actually actively paying attention to the material. Predictable behavioral responses, predictable in the sense that they are similar to that of other subjects, are indicative of attention and can thus be used to adjust the study material. For example, during presentation of educational videos, eye movements can be readily measured remotely with web cameras. If a given student moves their eyes similarly to that of an attentive group (recorded previously in a asynchronous broadcast or determined in real-time in a synchronous broadcast) then the student is most likely paying attention to the video. If that is not the case, then the student is not paying attention, and one could interrupt the video playback to engage the student, for example, in a question-and-answer dialog about the preceding material, similarly to what a real teacher might do in a clear classroom.

Experiment 1: Example Using Eye Movement

Sixty subjects were recruited to participate in a series of experiments where they were asked to watch five or six short videos in the laboratory while their eye movements and pupil size were monitored. The videos covered a variety of topics related to physics, biology and computer science (Table 1 and Table 2).

TABLE 1

| Experiment # | Title | Abbreviation | Video Style | Duration (min:sec) |
|---|---|---|---|---|
| 1, 2, 4, 5 | Why are Stars Star-Shaped? | Stars | Animation & Writing hand | 3:28 |
| 1, 2 | Why Do We Have More Boys Than Girls? | Birth rate | Animated | 2:48 |
| 1, 2, 4, 5 | The Immune System explained | Immune | Animated | 6:48 |
| 1, 2 | How modern Light Bulbs work | Bulbs | Animation & Writing hand | 2:57 |
| 1, 2 | Who invented the internet? and why? | Internet | Animated | 6:32 |
| 3 | What if we killed all the Mosquitoes? | Mosquitoes | Presenter & Animation | 4.21 |
| 3, 4, 5 | Are we all related? | Related | Presenter & Animation | 6.03 |
| 3 | Dielectrics in Capacitors | Capacitors | Writing hand & Animation | 5.46 |
| 3 | Work and the work-energy principle | Work energy | Writing hand & Animation | 6.26 |
| 3, 4, 5 | How do people measure Planets and Suns? | Planets | Presenter & Glass Board | 4.23 |
| 3, 4, 5 | What function does an Enzyme have? | Enzymes | Presenter & Glass Board | 4.29 |

TABLE 2

| Experiment # | Title | Example question | Example answer choices |
|---|---|---|---|
| 1, 2, 4, 5 | Why are Stars Star-Shaped? | What causes "suture lines"? | 1. Where the fibers that make up the eye's lens meet<br>2. Health problems<br>3. Short-sightedness<br>4. All options are correct |
| 1, 2 | Why Do We Have More Boys Than Girls? | What is the ratio of boys to girls born worldwide? | 1. 106:100<br>2. 100:100<br>3. 96:100<br>4. None of the options are correct |
| 1, 2, 4, 5 | The Immune System explained | What is the main job of the macrophage cell? | 1. To kill enemies<br>2. To cause inflammation<br>3. To activate cells<br>4. All options are correct |
| 1, 2 | How modern Light Bulbs work | Which gas exists in halogen light bulbs? | 1. Hydrogen bromide<br>2. Mercury chloride<br>3. Nitrogen bromide<br>4. Nitrogen fluoride |
| 1, 2 | Who invented the Internet? and why? | What was the goal of the first network? | 1. Optimizing processor usage<br>2. Facilitating communication<br>3. Sharing research materials<br>4. Espionage |
| 3 | What if we killed all the Mosquitoes? | Anopheles is the primary vector for: | 1. Malaria<br>2. Dengue<br>3. Yellow fever<br>4. Zika |

TABLE 2-continued

| Experi-ment # | Title | Example question | Example answer choices |
|---|---|---|---|
| 3, 4, 5 | Are we all related? | How much of the human DNA is coded into proteins? | 1. 2%<br>2. 98%<br>3. 80%<br>4. 30% |
| 3 | Dielectrics in Capacitors | What happens when a dielectric is inserted in the capacitor which is in a circuit with a battery? | 1. Charge Q increases<br>2. Charge Q decreases<br>3. Voltage V increases<br>4. Voltage V decreases |
| 3 | Work and the work-energy principle | A person pushes a box along a horizontal floor at a constant speed. The net work done on the box is: | 1. Zero<br>2. Positive<br>3. Negative<br>4. It depends |
| 3, 4, 5 | How do people measure Planets and Suns? | As the size of a star increases, the angular measurement needed in the stellar parallax technique . . . | 1. Does not matter<br>2. Increases<br>3. Decreases<br>4. Stays the same |
| 3, 4, 5 | What function does an Enzyme have? | What is the value of the activation energy in the example shown in the graph? | 1. 3<br>2. 73<br>3. 4<br>4. 5 |

Some videos featured a teacher writing on a board, while others use more modern storytelling using animations or the popular writing-hand style. A first cohort of subjects (N=27, 17 females, age 18-53 mean=26.74, standard deviation SD=8.98) watched five short videos. After each video they took a test with questions related to the material presented in the videos, which they were informed were going to come. After watching the videos and answering questions they watched the videos again. To test for attentional modulation of intersubject correlation (ISC), in the second viewing subjects performed a serial subtraction task (count in their mind backwards in steps of seven starting from a random prime number between 800 and 1000). This is a common distraction task in visual attention experiments. During the first attentive viewing eye movement of most subjects are well correlated (FIG. 3A), during the second, distracted viewing they often diverge (FIG. 3B). The was also true for the fluctuations of pupil size. To quantify this, the Pearson's correlation of these time courses between subjects were measured. For each subject an intersubject correlation (ISC) value was obtained as the average correlation of that subject with all other subjects in the group. The three measures taken were averaged, namely, vertical and horizontal gaze position as well as pupil size. This ISC is substantial during the normal (attended) viewing condition (FIG. 3C; ISC median=0.32, interquartile range IQR=0.12, across videos) and decreases in the second (distracted) viewing (ISC median=0.11, IQR=0.07). The attended viewing and distracted viewing are labeled A and D, respectively, in FIG. 3C. Specifically, a three-way repeated measures ANOVA shows a very strong fixed effect of the attention condition ($F(I,231)=749.06$, $p=1.93*10^{\wedge}-74$) a fixed effect of video ($F(4,231)=32.29$, $p=2.23*10^{\wedge}-21$) and a random effect of subject ($F(26,231)=9.21$, $p=1.62*10^{\wedge}-23$). This confirms the evident variability across videos and subjects. The effect of attention, however, is so strong that despite the variability between subjects one can still determine the attention condition near perfectly from the ISC of individual subjects (FIG. 3B). Specifically, a receiver operator characteristic curve for determining attentional state has an area under the curve of $Az=0.944\pm0.033$ (mean±SD over videos).

Experiment 2: Intentional vs Incidental

Figure 3E:
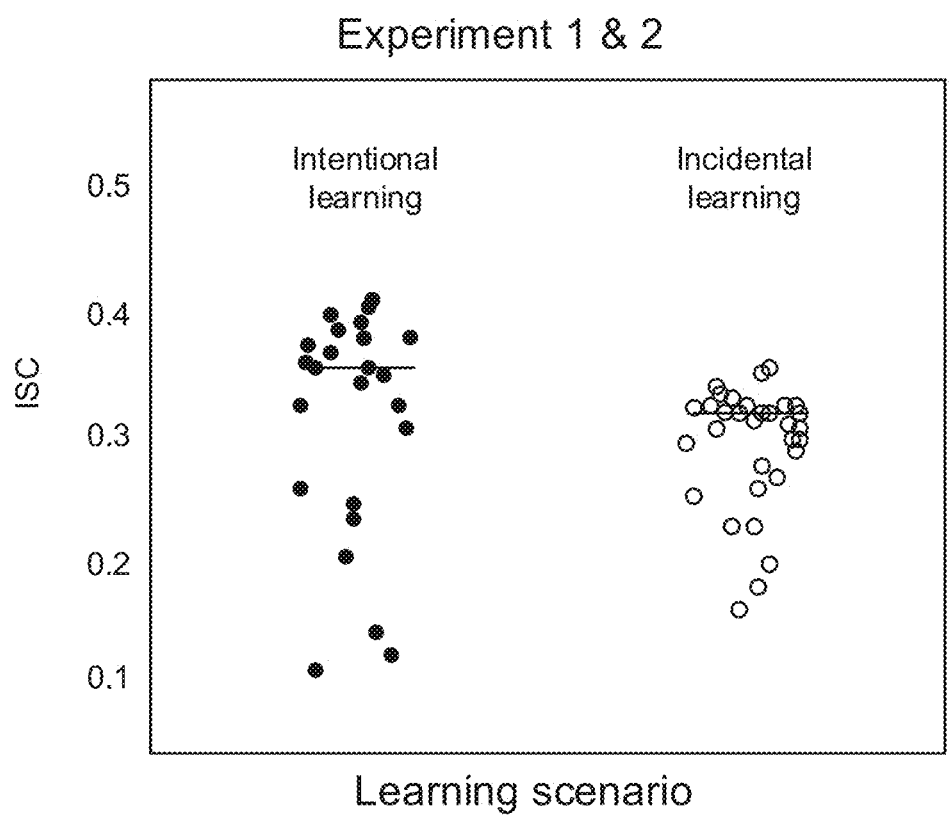
FIG. 3E is a graph demonstrating that Intentional learning shows a higher ISC. Each dot is the average ISC for each subject when they watched all instructional videos in the attend condition using either the intentional or incidental learning style.
Figure 4A:
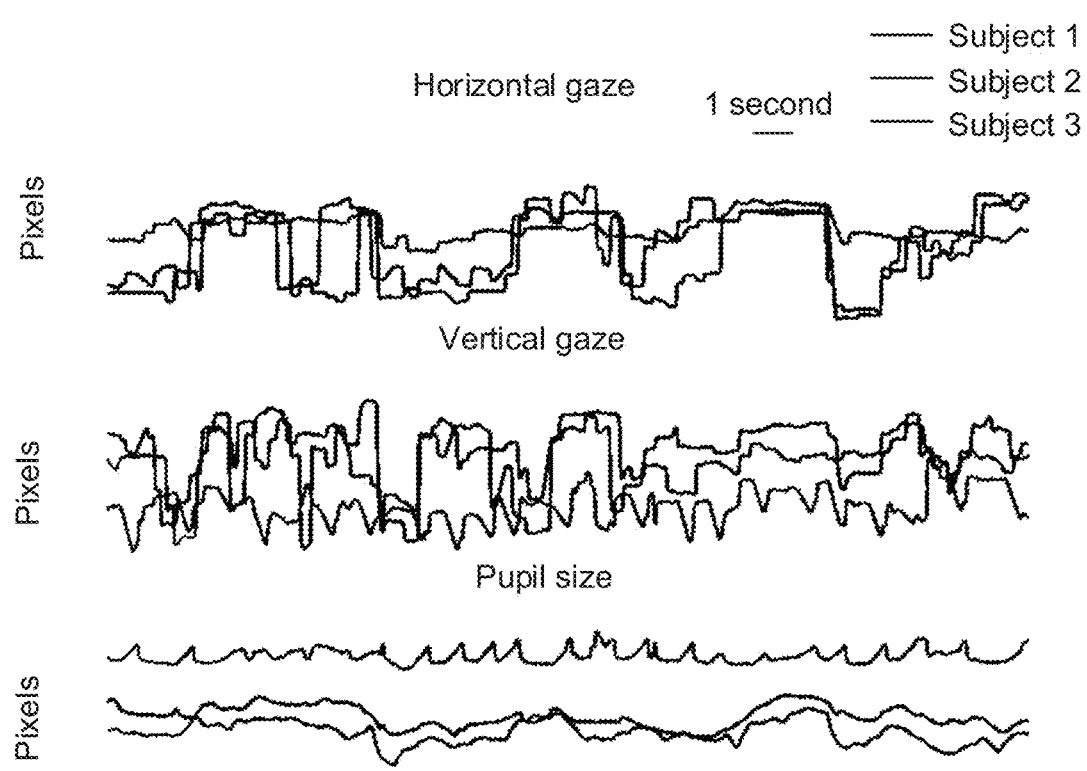
FIG. 4A shows a graph illustrating eye movements of three representative subjects as they watch the "Why are Stars Star-Shaped?" video. Two high performing subjects have similar eye movements and pupil size. A third, low performing subject does not match their gaze position or pupil size.
Figure 4B:
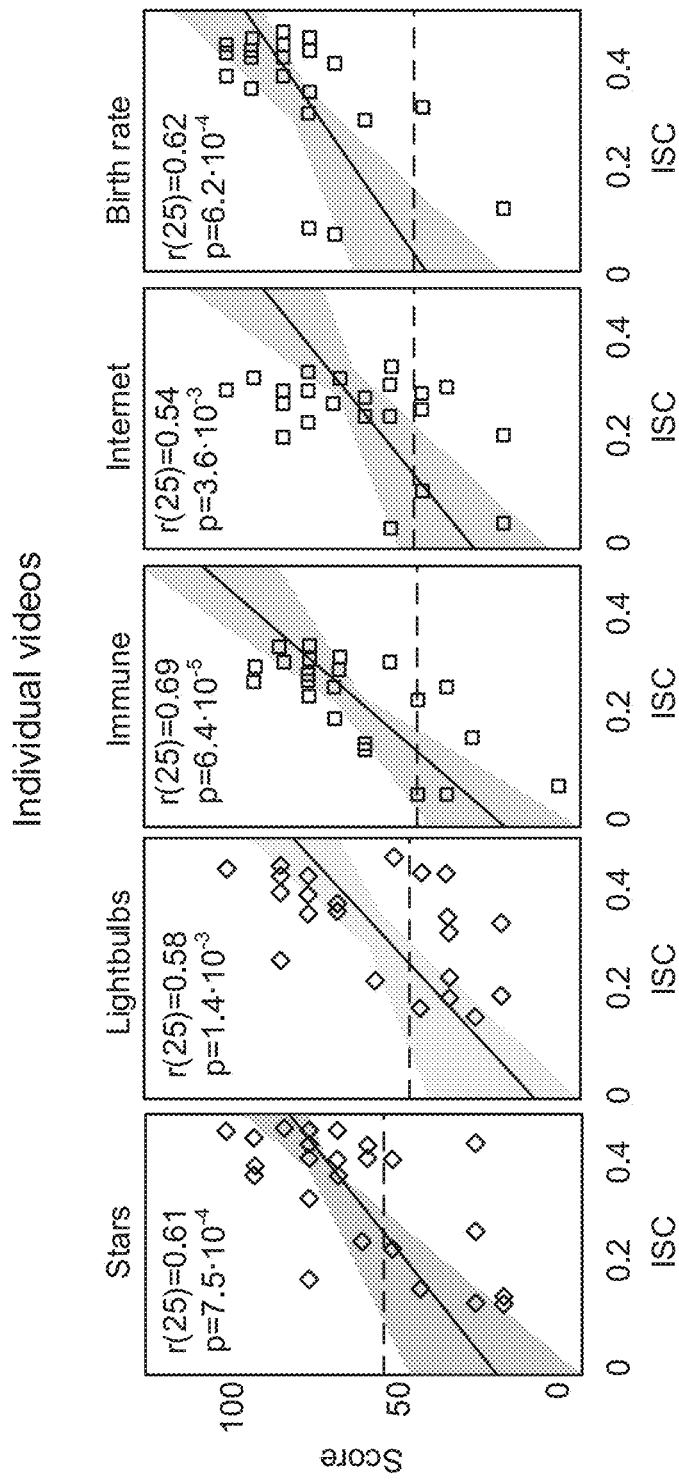
FIG. 4B graphs the ISC of eye movement and performance on quiz taking (Score) for each of five videos in Experiment 1. Each dot is a subject. The high and low performing subjects (subjects 1-3) from FIG. 3A are highlighted for the Stars video. Dotted lines represent performance of subjects naive to the video.
Figure 4C:
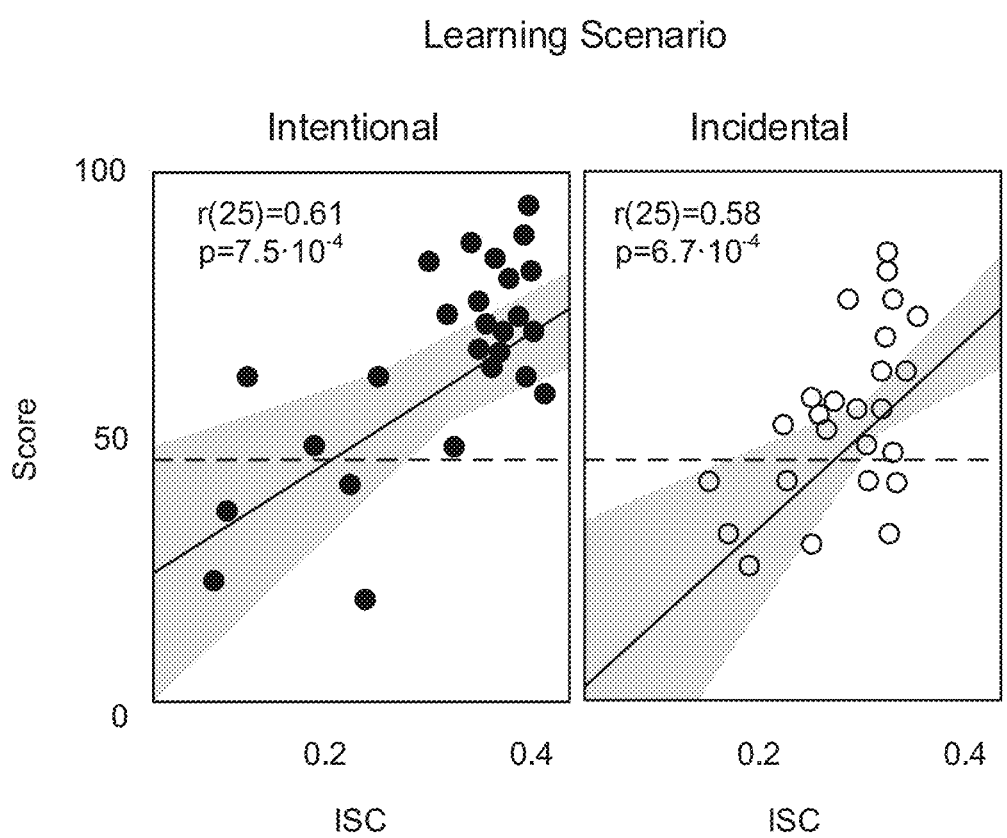
FIG. 4C is similar to FIG. 4B but averaging over the five videos. The data was collected in two different conditions: During intentional learning (Experiment 1) where subjects knew they would be quizzed on the material. During incidental learning (Experiment 2) where subjects did not know that quizzes would follow the viewing.

To test the effect of motivation Experiment 1 was repeated, but this time subjects did not know that they would be quizzed on the content of the videos. The two conditions thus constitute intentional and incidental learning which are known to elicit different levels of motivation. A higher ISC was found in the intentional learning condition (ISC median=0.325, IQR=0.12, N=27) as compared to the incidental learning condition (ISC median=0.317, IQR=0.06, N=30) (FIG. 3E; twotailed Wilcoxon rank sum test: $z=2.67$, $p=7.68*10^{\wedge}-3$). This suggests that lower motivation in the incidental learning condition resulted in lower attentional levels and thus somewhat less correlated eye movements and pupil size. The increased motivation in the intentional learning condition is also reflected in the increased test scores as compared to the incidental learning condition (FIG. 4C; intentional learning score=$65.22\pm18.75$ points, N=27, incidental learning score=$54.53\pm15.31$ points, N=31; two-sample t-test: $t(56)=2.39$, $p=0.02$, $d=0.63$).

Experiment 1 confirmed the hypothesis that if subjects are distracted the ISC of eye movements and pupil size is reduced. Without wishing to be bound to any particular theory, given the well-established link between attention and memory, the ISC is believed to be predictive of how much information each subject retained from the video. Subjects were quizzed after they had watched the video using a short four alternative forced-choice questionnaire (11-12 questions). Subjects that watched the video performed significantly better than naive subjects ($65.2\%\pm18.8\%$ versus naive: $45\%\pm8.8\%$; $t(56)=-5.37$ $p=1.58*10^{\wedge}-6$; see Methods section for details). A strong correlation was found between ISC and test scores across subjects for all tested videos (FIG. 3B; $r=0.61\pm0.06$, SD across five videos, $p<3.60*10^{\wedge}-3$). This is the case regardless of whether subjects were aware they would be tested or not (Intentional: $r(25)=0.61$, $p=7.51*10^{\wedge}-4$, Incidental: $r(29)=0.58$, $p=5.87*10^{\wedge}-4$). Evidently subjects with lower ISC performed poorer on the quiz (e.g., subject 3 in FIG. 4A). Inversely, subjects with correlated eye movements obtain higher test scores (e.g., subject 1 & 2 in FIG. 4A). Basically, if subjects do not follow the dynamics of the video with their eyes, they have not paid attention and as a result their quiz scores are lower. Alternatively, subjects with prior knowledge on the material were more interested, and thus paid more attention.

Experiment 3: Video Presentation Style

Figure 4D:
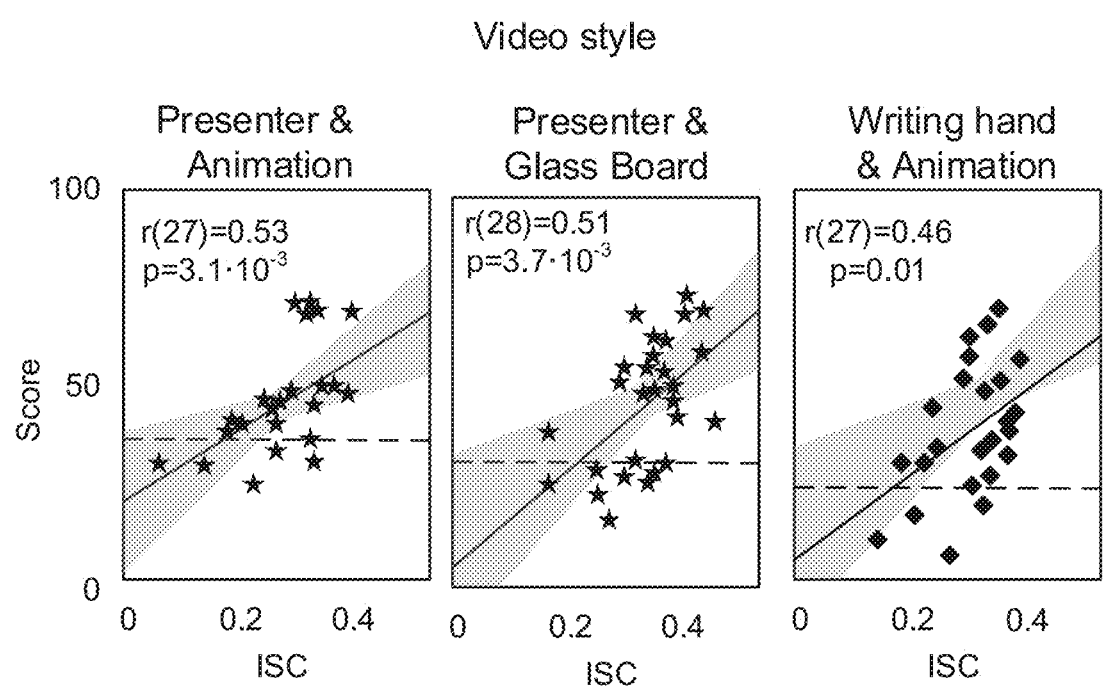
FIG. 4D is a graph showing that videos in three different production styles (Experiment 3) show similar correlation values between test scores and ISC. Each point is a subject where values are averaged over two videos presented in each of the three styles.

This effect was true for all five videos tested (in Experiment 1: Intentional And in Experiment 2: Incidental). The style of these five videos were either animation (lightbulbs, immune, internet) or showed a hand drawing figures (stars, birth). To test whether this effect is robust across different types of video styles, an additional experiment was performed on a new cohort of 30 subjects (Experiment 3; 22 females, 8 males, age 18-50, mean=25.73, SD=8.85 years). All subjects watched 6 videos on different topics produced in three different styles (two videos each): a real-live presenter along with animation, a presenter writing on a glass board, and writing hand with animation. Despite the different visual appearance and dynamic, a strong correlation between ISC and test scores was found for all three styles (FIG. 4D, Animation & Presenter: $r(27)=0.53$, $p=3.1*10^{\wedge}-3$), Animation & Writing hand: $r(28)=0.51$, $p=3.7*10^{\wedge}-3$), Glassboard & Presenter: $r(27)=0.46$, $p=0.01$).

Figure 4E:
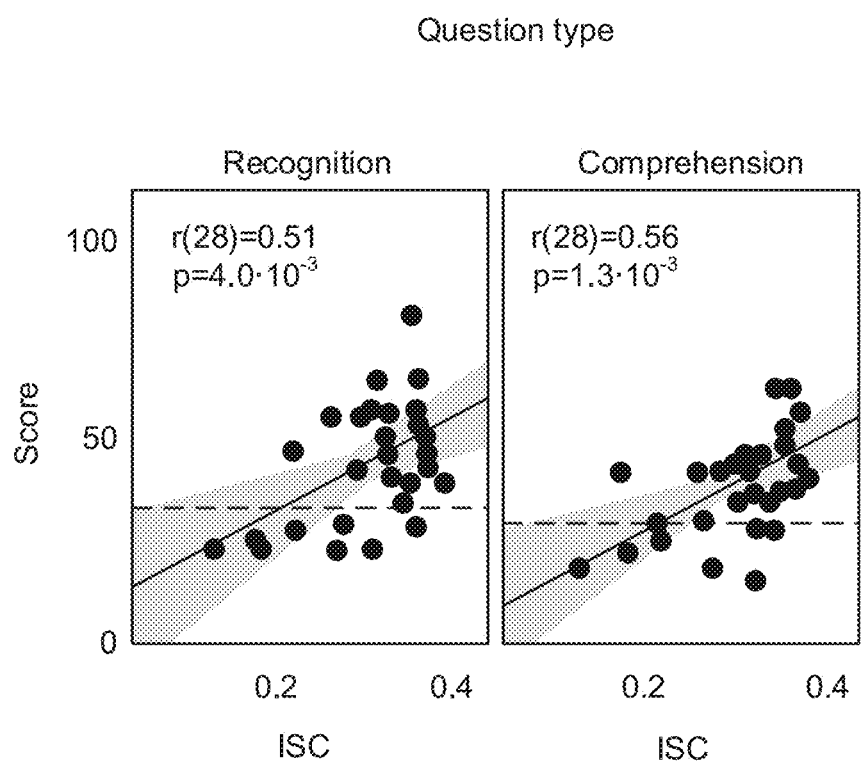
FIG. 4E depicts a graph showing quiz score results for different question types. Each point is a subject with test scores averaged over all questions about factual information (recognition) versus questions requiring comprehension. ISC were averaged over all six videos in Experiment 3.

One possibility is that attention favors recognition of factual information, but that questions probing for comprehension of the material require the subject to disengage from the video to process the content "offline". Experiment 3 therefore included comprehension questions (41 out of a total of 72 questions across the 6 videos). Overall subjects did similarly on the comprehension questions as compared to the recognition questions (FIG. 4E) and a significant correlation with ISC was found for these comprehension questions (r(28)=0.56, p=1.3*10^-3), and a correlation with recognition performance (r(28)=0.51, p=4.0*10^-3) was, once again, found. These correlation values do not differ significantly (asymptotic z-test after Fisher r-to-z conversion, p=0.52) suggesting that comprehension and recognition are both affected by attention. Indeed, quiz scores for comprehension and recognition questions are significantly correlated across subjects Experiment 4 and Experiment 5

Figure 5A:
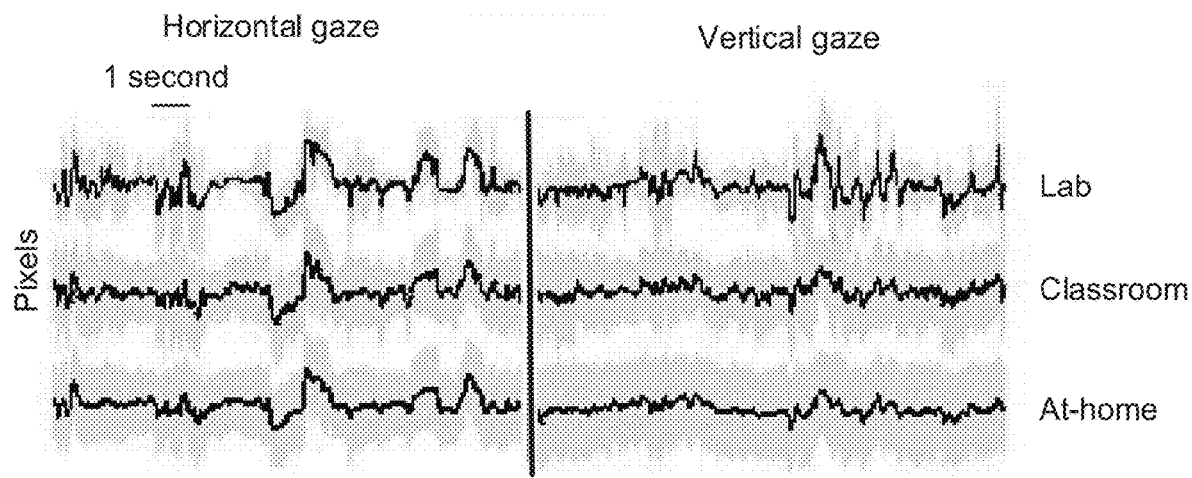
FIG. 5A are graphs depicting gaze position for 'Immune' video in Laboratory, Classroom and At-home settings. Median and interquartile range are taken across subjects (solid line and grayed area respectively).
Figure 5B:
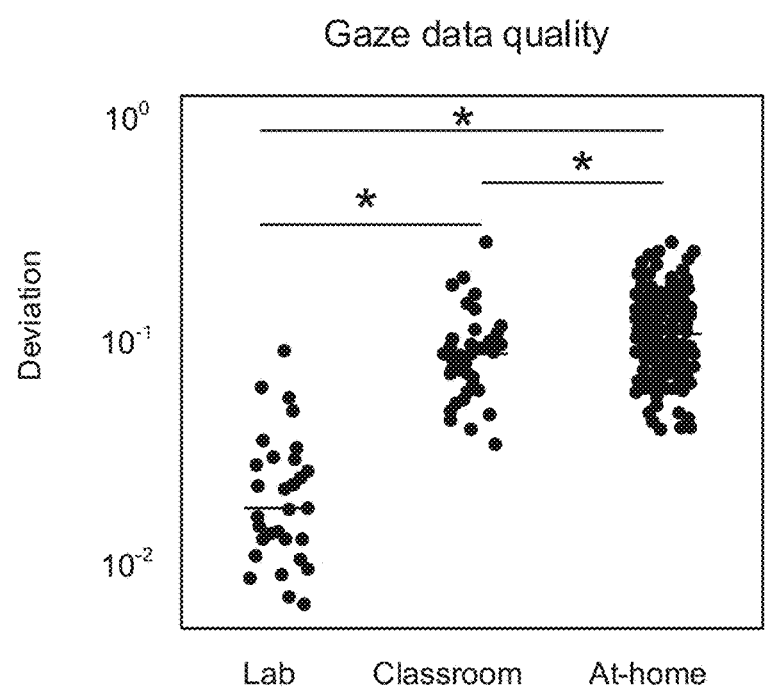
FIG. 5B is a graph depicting deviation of gaze position when subjects looked at 4 "validation" dots presented in sequence on the corners of the screen, collected in the Laboratory, Classroom and At-home settings for the first video shown to subjects (see Methods). * indicates a significant difference in means.

To test the method in a non-laboratory setting an online platform was developed that operates on a large scale of users. The platform used standard web cameras and existing eye tracking software that can run on any web browser. The software operates on the remote computer of the subjects and captures gaze position. In one experiment 82 subjects (female=21, age 18-40, mean=19.6, SD=2.7 years) were recruited from a college physics class to participate after their lab sessions using the desktop computers available in the classroom (Experiment 4: Classroom). In another experiment 1012 participants (female=443, age 18-64, mean=28.1, SD=8.4 years) were recruited on MTurk and Prolific. These are online platforms that assign tasks to anonymous subjects and compensate them for their work (Experiment 5: At-home). The subjects used the webcam on their own computers. The gaze position data collected with the web camera is significantly noisier than using the professional eye tracker in the lab (FIG. 5A). To quantify this, the accuracy of gaze position determination was computed when subjects are asked to look at a dot on the screen (FIG. 5B). As expected, a significant difference in gaze position accuracy between the laboratory and the classroom (two-sample t-test t(69)=-7.73, p=6.3*10^-11) and a significant difference between the classroom and the at-home setting (t(242)=2.46, p=0.01). Despite this signal degradation a high correlation was found between the median gaze position data for laboratory and classroom data (Horizontal gaze: r=0.87±0.04; Vertical gaze: r=0.75±0.04) and laboratory and at-home (Horizontal gaze: r=0.91±0.04; Vertical gaze: r=0.83±0.04).

To preserve online privacy of the subjects one can evaluate eye movements remotely by correlating each subject's eye movements with the median gaze positions (FIG. 5A). Instead of ISC with all members of the group, the correlation with the median position was computed locally without the need to transmit individual eye position data (see Methods). Here, in addition to eye-position also eye movement velocity was measured, which is high when subjects move their gaze in the same direction, regardless of absolute gaze position (see Methods). These eye movement metrics were combined by taking a weighted average of the vertical, horizontal and velocity ISC (wISC; see Methods). This wISC of eye-movement robustly correlates with subsequent test scores (FIG. 5C and FIG. 5D) despite the lower quality of the gaze position data. In fact, the correlation of wISC with test scores for the classroom (FIG. 5C; r=0.46±0.16, p<0.01) are comparable to the values in the laboratory experiments (r=0.59±0.08, all p<0.01; compare to FIG. 4B). The at-home experiment also had a highly significant correlation between wISC and subsequent test scores (FIG. 5D; r=0.47±0.08, p<3.9*10^-8). The prediction accuracy of the test score is 14.59%±16.86% (median across videos, IQR across all videos and subjects), which is equivalent to 1.75 out of 12 questions. Using the disclosed method one can essentially predict how well a subject is going to perform on a quiz by comparing their eye movements to the median eye movements. This quiz performance correlates with an assessment of the subject's attention to the dynamic media.

Methods

Participants 1182 subjects participated in one of five different experimental conditions. The first two experiments tested the learning scenario of online education, namely intentional learning (Experiment 1, N=27, 17 females, age 18-53 M=26.74, SD=8.98, 1 subject was removed due to bad data quality) and incidental learning (Experiment 2, N=31, 20 females, age range 18-50, mean 26.20, SD 8.30 years; 3 subjects were removed due to bad signal quality). Experiment 3, was designed to investigate the effect of different video styles and assessment types (N=31, 22 females, age 18-50, M=25.73, SD=8.85 years; 2 subjects were removed due to bad signal quality). Participants for the laboratory Experiments 1-3 were recruited from mailing lists of students at the City College of New York and local newspapers ads (to ensure a diverse subject sample). Experiment 4 was designed to replicate the findings from the laboratory in a classroom setting. Participants were all enrolled in the same physics class at the City College of New York (N=82, female=21, age 18-40, M=19.6, SD=2.7 years). Experiment 5 replicated the finding from the laboratory in a home setting. Amazon Mechanical Turk and Prolific was used to recruit subjects (N=1012, 473 female, age range 18-64, M=28.1, SD=8.4 years). Subjects of Experiments 1-4 only participated in a single experiment, i.e., they were excluded from subsequent Experiments. In Experiment 5 subjects were allowed to participate in more than one assignment so the total count are not unique subjects.

Stimuli:

The five video stimuli used in Experiments 1, 2, 4 and 5 were selected from the 'Kurzgesagt—In a Nutshell' and 'minute physics' YouTube channels. They cover topics relating to physics, biology, and computer science (Table 1 and 2, Range: 2.4-6.5 minutes, Average: 4.1±2.0 minutes). Two of the videos ('Immune' and 'Internet') used purely animations, where 'Boys' used paper cutouts and handwriting. 'Bulbs' and 'Stars' showed a hand drawing illustrations aiding the narrative. The six video stimuli used in Experiments 3-5 were selected from 'Khan Academy', 'eHow', 'Its ok to be smart' and 'SciShow'. The videos cover topics related to biology, astronomy and physics (Table 1 and 2, Duration: 4.2-6 minutes long, Average: 5.15±57 seconds). They were specifically chosen to follow recommendations from a large scale MOOC analysis. The three styles chosen were based on popular styles from YouTube. 'Mosquitoes' and 'Related' produced in the 'Presenter & Animation' style shows a presenter talking as pictures and animations are shown. 'Planets' and 'Enzymes' were produced in the 'Presenter & Glass Board' style and shows a presenter drawing illustrations and equations on a glass board facing the viewer. 'Capacitors' and 'Work energy' used the 'Animation & Writing hand' style.

Procedure

Laboratory Experiments

In Experiment 1 (intentional learning), subjects watched a video and answered afterwards a short four-alternative forced-choice questionnaire. The subjects were aware that they would be tested on the material. The test covered factual information imparted during the video (11-12 recall questions). Examples of questions and answer options can be found in Tab. 1. In Experiment 2 (incidental learning) subjects were not aware that they would be tested or asked questions regarding the material. They first watched all 5 videos, and subsequently answered all the questions. In Experiment 3, subjects were informed that questions regarding the material would be presented after each video and followed the procedure of Experiment 1, using a different set of stimuli. The order of video presentation, questions and answer options were randomized for all three experiments. Common for Experiments 1-3, after subjects had watched all video stimuli and answered questions, they watched all the videos again in a distracted condition using the same order as the attend condition. In this condition participants counted backwards, from a randomly chosen prime number between 800 and 1000, in decrements of 7. This task aimed to distract the subjects from the stimulus without requiring overt responses and is based on the serial subtraction task used to assess mental capacity and has previously been used to assess attention.

Online Experiments

The web camera experiments (Experiments 4 and 5) were carried out using a framework developed in-house for online experiments. In Experiment 4 (classroom) subjects used the same computers they use for their class exercises. From the Elicit webpage subjects could select which video they wanted to watch from a list of 5 videos. Subjects were given a short verbal instruction besides the written instructions that were provided through the website. In Experiment 5 (at-home) subjects could select HITs (Amazon Mechanical Turk assignments) or assignments (Prolific) that contained a single video with questions and otherwise followed the same procedure as Experiment 4. For both Experiment 4 and 5, subjects were informed that there would be questions regarding the material after the video. They first received instructions regarding the procedure, performed the webcam calibration to enable tracking of their eye movements, watched a single video and answered a four-alternative choice questionnaire for that video. Subjects were allowed to perform more than one assignment, i.e., view more than one video and answer questions. In Experiment 5 subjects were additionally shown a short instruction video on how to calibrate the webcam to track eye movements.

Online Eye Tracking Using Web Cameras

The webcam-based gaze position data was recorded using WEBGAZER™. WEBGAZER™ runs locally on the subject's computer and uses their webcam to compute their gaze position. The script fits a wireframe to the subject's face and captures images of their eyes to compute where on the screen they are looking. Only the gaze position and the coordinates of the eye images used for the eye position computation were transmitted from the subject's computer to a web server. In order for the model to compute where on the screen the participant is looking, a standard 9-point calibration scheme was used. Subject had to achieve a 70% accuracy to proceed in the experiment. User data was transferred to the server for analysis. However, in a fully local implementation of the approach no user data would be transmitted. Instead, median eye positions of a previously recorded group would be transmitted to the remote location and median-to-subject correlation could be computed entirely locally.

Preprocessing of Webcam-Based Gaze Position Data

WEBGAZER™ estimates point of gaze on the screen as well as the position and size of the eyes on the webcam image. Eye position and size allowed estimations of the movement of the subject in horizontal and vertical directions. The point of gaze and eye image position & size were up-sampled to a uniform 1000 Hz, from the variable sampling rate of each remote webcam (typically in the range of 15-100 Hz). An inclusion criteria for the study was that the received gaze position data should be sampled at at least 15 Hz in average. Missing data were linearly interpolated and the gaze positions were denoised using a 200 ms and 300 ms long median filter. Movements of the participant were linearly regressed out of the gaze position data using the estimated position of the participant from the image patch coordinates. This was done because the estimated gaze position is sensitive to movements of the subject (this was found to increase the overall ISC). Subjects that had excessive movements were removed from the study (16 out of 1159 subjects; excessive movement is defined as 1000 times the standard deviation of the recorded image patch coordinates in the horizontal, vertical and depth directions). Blinks were detected as peaks in the vertical gaze position data. The onset and offset of each blink were identified as a minimum point in the first order temporal derivative of the gaze position. Blinks were filled using linear interpolation in both the horizontal and vertical directions. Subjects that had more than 20% of data interpolated using this method was removed from the cohort (14 out of 1159 subjects). The visual angle of gaze could not be computed because no accurate estimate was available for the distance of the subject to the screen. Instead, gaze position is measured in units of pixels, i.e., where on the screen the subject is looking. Because the resolutions of computer screens vary across subjects, the recorded gaze position data in pixels were normalized to the width and height of the window the video was played in (between 0 and 1 indicating the edges of the video player). Events indicating end of the video stimuli ("stop event") were used to segment the gaze position data. The start time for each subject was estimated as the difference between the stop event and the actual duration of the video. This was done because the time to load the YouTube player was variable across user platforms.

Estimate of the Quality of Gaze Position

To compute the quality of the gaze position data, subjects were instructed to look at a sequence of 4 dots in each corner of the screen, embedded in the video stimuli before and after the video. The actual dot position on the subject's screen was computed and compared to the captured eye gaze position of the WEBGAZER™. The deviation was computed as the pooled deviation of the recorded gaze position from the position of the dot, while the subject looked at each dot. Poor data quality is indicated by higher deviation. Furthermore, subjects with low quality calibration were identified by computing the spatial difference of recorded gaze position data of opposing dots in the horizontal and vertical direction when they were looking at the 4 dots. If the difference in recorded gaze position between dot pairs were in average negative the subject was excluded (135 of 1159).

Preprocessing of Laboratory Gaze Position Data

In the laboratory (Experiments 1-3) gaze position data was recorded using an Eyelink 1000 eye tracker (SR Research Ltd. Ottawa, Canada) at a sampling frequency of 500 Hz using a 35 mm lense. The subjects were free to move their heads, to ensure comfort (no chin rest). A standard 9-point calibration scheme was used utilizing manual verification. To ensure stable pupil size recordings, the background color of the calibration screen and all instructions presented to the subjects were set to be the average luminance of all the videos presented during the experiment. In between each stimulus presentation a drift-check was performed and tracking was recalibrated if the visual angular error was greater than 2 degrees. Blinks were detected using the SR research blink detection algorithm and remaining peaks were found using a peak picking algorithm. The blink and 100 ms before and after were filled with linearly interpolated values.

Intersubject Correlation and Attention Analysis of Gaze Position Data

Intersubject correlation of eye movements is calculated by (1) computing the Pearson's correlation coefficient between a single subject's gaze position in the vertical direction with that of all other subjects while they watched a video. (2) obtaining a single ISC value for a subject by averaging the correlation values between that subject and all other subjects (ISC) (3) and then repeating steps 1 and 2 for all subjects, resulting in a single ISC value for each subject. Step 3 was repeated for the horizontal eye movements $ISC_{horizontal}$ and the pupil size $ISC_{pupil}$. To obtain the measure used for laboratory experiment the three ISC values were averaged and then referred to as $ISC=(ISC_{vertical}+ISC_{horizontal} ISC_{pupil})/3$. The ISC values for the attend and distract conditions, were computed on the data for the two conditions separately. To test whether ISC varies between the attend and distract conditions, a three-way repeated measures ANOVA was used with fixed effect of video and attentional state (attend vs. distract) and random effect of subject. As an additional measure the receiver operating characteristic curve (ROC) was used. Each point on the curve is a single subject. To quantify the overall ability of ISC to discriminate between attend and distract conditions the area under the ROC curve is used (AUC). To test for the effect motivation has, ISC was computed for each video in the attend condition and averaged across all videos. Because the distribution was not Gaussian, a difference in median ISC values was tested with a Wilcoxon rank sum test. To test for the effect of video style on the attentional modulation of ISC a three-way repeated measures ANOVA was performed. The random effect was subject and fixed effects were stimuli, attentional condition and video style.

Weighted Intersubject Correlation of Eye Movements

For the experiments with the web camera in the classroom and at-home the median gaze position across all subjects (FIG. 5A) was computed for each time point in the video. The Pearson's correlation coefficient of that median time course with the gaze position of each subject was computed. This is referred to this as median-to-subject correlation, $MSC_{vertical}$ and $MSC_{horizontal}$. In principle this can be computed with the median gaze positions previously collected on a sample group for each video. To compute this remotely without transmitting the gaze data of individual users, one would transmit this median gaze positions to the remote user of the online platform (two values for each time point in the video). MSC can then be computed locally by the remote user. MSC was also computed for the velocity of eye movements as follows. First movement velocity was computed by taking the temporal derivative of horizontal and vertical gaze positions using the Hilbert transform. Two-dimensional spatial vectors of these velocity estimates (combining Hilbert transforms of horizontal and vertical directions) were formed. These vectors are normalized to unit length. The median gaze velocity vectors is obtained as the median of the two coordinates across all subjects. The median-to-subject correlation of velocity, $MSC_{velocity}$, is then computed as the cosine distance between the velocity vectors of each subject and the median velocity vector, averaged over time. Finally, the three MSC measures were combined to obtain a single weighted intersubject correlation value for each subject: $wISC=w_1 MSC_{vertical}+w_2 MSC_{horizontal}+w_3 MSC_{velocity}$. The weights W are chosen to best predict quiz scores with the constraint that they must sum up to 1 and that they are all positive. This is done with conventional constrained optimization. The constraints insure that the wISC values are bounded between −1 and 1. To avoid a biased estimate of predictability these weights were optimized for each subject on the gaze/score data leaving out that subject from the optimization, i.e. use leave-one out cross-validation.

Subject Learning Assessment

Four-choice, multiple-choice questions were used to assess the performance of subjects (Score). Test performance was calculated as the percentage correct responses each subject gave for each video. For questions that had multiple correct options, points were given per correct selected options and subtracted per incorrect selected option. The questionnaires were designed in pilot experiments to yield an even distribution of answer options from subjects that had not seen the videos. All questions and answer options can be found here. To estimate the baseline difficulty of the questions, separate naive cohorts of subjects were given the same questions without seeing the videos. Two different cohorts were recruited from the City College of New York to compare against the cohorts recruited for Experiments 1-4 (Experiment 1,2 and 4, N=26; Experiment 3, N=15) and a third from Prolific to compare against the at-home experiment cohort (Experiment 5, N=25). When evaluating the different learning styles (incidental and intentional learning) in Experiments 1 and 2, subjects' scores and ISC values were averaged across all videos. ISC was compared to subject test performance by computing the Pearson's correlation coefficient between ISC and test performance. Similarly, to test the effect of video style, the ISC and scores for each subject were averages for the videos produced in different styles and correlated using Pearson's correlation. Testing the connection between ISC and test scores on each individual video, subjects' scores were compared with the ISC using Pearson's correlation. To test whether there is a significant difference in correlation between comprehension or recall questions and ISC the same ISC values were used and performed a test between correlation values with a shared dependent variable. Testing how well eye-movement ISC can predict the performance of subjects on tests regarding the material in the online setting, leave-one-out cross validation was used. The attention model on all subjects were estimated leaving but one subject's ISC values and their corresponding test scores. How well ISC predicts the test score was estimated on the left-out subject. This was done for all subjects and the median absolute deviation between the prediction and the actual score was computed. To test if the eye-movement ISC model is statistically better than a naive model (only predicting the average score), the prediction errors of the two models were subjected and a two-sided sign test was performed.

Similarity Metric

In some cases, the similarity metric (e.g., coefficient, percentile, etc.) described herein measures or indicates a level of similarity between two time courses of data, such as a level of similarity between a time course of measured response and a time course of predicted/anticipated response. If the patterns of the two time courses of data are the same or very similar, the similarity metric will have a relatively higher value compared to the situation in which the patterns of the two time course of data are very different. Thus, in some embodiments, the similarity metric indicates a degree of matching between the pattern of the time course of the measured response and the pattern of the time course of the predicted/anticipated response.

Specialized Processing System

Figure 6:
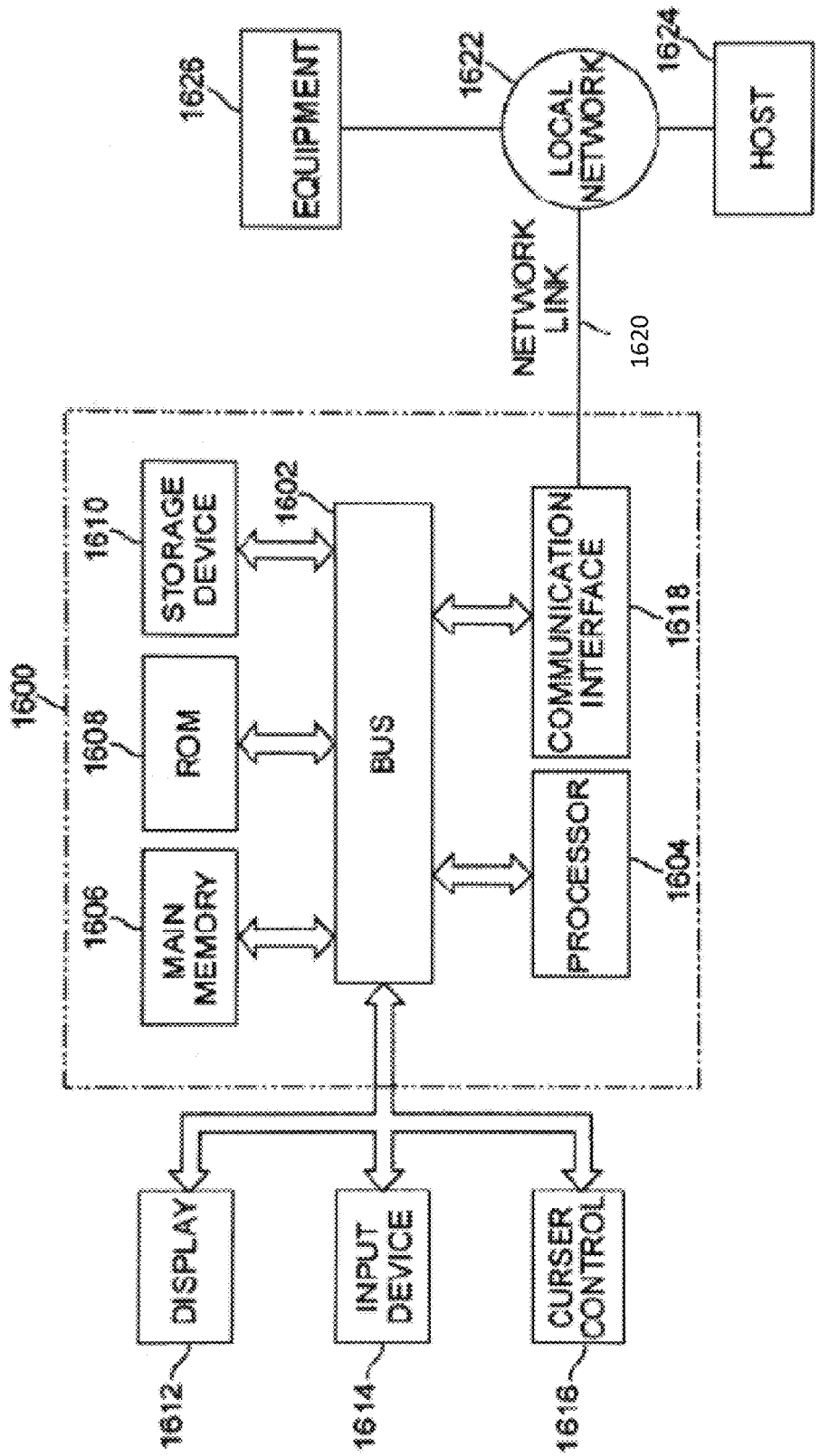
FIG. 6 illustrates a specialized processing system.

FIG. 6 illustrates a specialized processing system 1600 for implementing the method of assessing human attention described herein.

For example, in some embodiments, the processing system 1600 may be configured to provide a dynamic media for presentation to a human subject; electronically obtain a digitally recorded time course of attention-predictive response for the human subject, wherein the digitally recorded time course of the attention-predictive response is a digital recording of the attention-predictive response of the human subject over time while the dynamic media is being presented; and determine a similarity metric indicating a similarity between (1) the digitally recorded time course of the attention-predictive response and (2) a corresponding time course of anticipated response to the dynamic media.

Processing system 1600 includes a bus 1602 or other communication mechanism for communicating information, and a processor 1604 coupled with the bus 1602 for processing information. The processing system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processing system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processing system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processing system 1600 can be used to perform various functions described herein. According to some embodiments, such use is provided by processing system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a network, such as the Internet or a local network. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system

1600 can send messages and receive data, including program code, through the network(s), the network link 1620, and the communication interface 1618.

In some embodiments, the processing system 1600, or one or more components therein, may be considered a processing unit.

Also, in some embodiments, the methods described herein may be performed and/or implemented using the processing system 1600. For example, in some embodiments, the processing system 1600 may be an electronic system to assess human attention. The processing system 1600 may include a processing unit configured to provide a dynamic media for presentation to a human subject; electronically obtain a digitally recorded time course of attention-predictive response for the human subject, wherein the digitally recorded time course of the attention-predictive response is a digital recording of the attention-predictive response of the human subject over time while the dynamic media is being presented; and determine a similarity metric indicating a similarity between (1) the digitally recorded time course of the attention-predictive response and (2) a corresponding time course of anticipated response to the dynamic media.

Optionally, the processing unit is configured to determine the corresponding time course of the anticipated response to the dynamic media by using a computer model.

Optionally, the processing unit is configured to determine the corresponding time course of the anticipated response to the dynamic media by aggregating responses of human test subjects to the dynamic media.

Optionally, in the processing system 1600, the corresponding time course of the anticipated response is an anonymous aggregate of the responses of the human test subjects.

Optionally, the human subject is remote, and the system 1600 is configured to present the dynamic media over a computer network.

Optionally, in the processing system 1600, the attention-predictive response is cursor movement on a computer that is presenting the dynamic media.

Optionally, in the processing system 1600, the attention-predictive response comprises gaze-position, eye movement velocity, pupil size, head movement, hand movement, facial expression, a heart rate, or a combination of two or more of the foregoing.

Optionally, in the processing system 1600, the attention-predictive response comprises both gaze-position and eye movement velocity.

Optionally, the processing unit is configured to obtain the digitally recorded time course of the attention-predictive response from a digital recording device that is configured to be attached to the human subject.

Optionally, in the processing system 1600, the attention-predictive response comprises heart rate, breathing effort, galvanic skin response, or a combination of two or more of the foregoing.

Optionally, in the processing system 1600, the dynamic media comprises a pre-recorded dynamic media.

Optionally, in the processing system 1600, the dynamic media comprises a real-time dynamic media that is broadcast by a broadcaster.

Optionally, the processing unit is further configured to determine an additional similarity metric indicating a similarity between (1) an additional digitally recorded time course of attention-predictive response of an additional human subject and (2) the corresponding time course of anticipated response to the dynamic media Optionally, the processing unit is configured to average the similarity metric and the additional similarity metric to obtain an attention score for the human subjects.

Optionally, in the processing system 1600, the corresponding time course of the anticipated response to the dynamic media comprises a median response of a group of human test subjects.

Optionally, in the processing system 1600, the dynamic media comprises a dynamic video of a video game, and wherein the system 1600 is configured to adjust the video game based on the similarity metric.

Optionally, in the processing system 1600, the corresponding time course of anticipated response is based on responses of other human subjects to which the dynamic media is presented.

Optionally, in the processing system 1600, the similarity metric indicates a degree of pattern matching between (1) the digitally recorded time course of the attention-predictive response and (2) the corresponding time course of anticipated response to the dynamic media.

Optionally, in the processing system 1600, the attention-predictive response indicates saccade.

Optionally, in the processing system 1600, the attention-predictive response indicates blink rate.

Also, in some embodiments, the methods described herein may be implemented using software. For example, a processor-readable non-transitory medium may store a set of instructions, an execution of which will cause a method to assess human attention to be performed. The method may include: providing a dynamic media for presentation to a human subject; obtaining a digitally recorded time course of attention-predictive response for the human subject, wherein the digitally recorded time course of the attention-predictive response is a digital recording of the attention-predictive response of the human subject over time while the dynamic media is being presented; and determining a similarity metric indicating a similarity between (1) the digitally recorded time course of the attention-predictive response and (2) a corresponding time course of anticipated response to the dynamic media.

This written description uses examples to disclose the invention, including the best mode, and also to enable any person skilled in the art to practice the claimed invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An electronic system configured to provide a dynamic media for presentation to a human subject to assess human attention, the electronic system comprising:
    a processing unit is configured to communicatively couple with a digital recording device, the processing unit configured to:
        electronically obtain, from the digital recording device, a digitally recorded time course of attention-indicative response for the human subject, wherein the digitally recorded time course of the attention-indicative response is a digital recording of the attention-indicative response of the human subject over time while the dynamic media is being presented to the human subject; and
        determine a level of attention of the human subject to the dynamic media by determining a similarity metric indicating a degree of pattern matching based on a comparison between (i) a first data pattern of the digitally recorded time course of the attention-indicative response and (ii) a second data pattern of a time course of anticipated response to the dynamic media;
        wherein the digitally recorded time course of the attention-indicative response comprises a first time series of first data in which different values of the first data obtained at different respective time points of the dynamic media over a first period of time form the first data pattern;
        wherein the time course of the anticipated response comprises a second time series of second data in which different values of the second data obtained at different respective time points of the dynamic media over a second period of time form the second data pattern; and
        wherein the first data in the first time series and the second data in the second time series form the attention-indicative response and the anticipated response respectively, to the same dynamic media.

2. The electronic system of claim 1, wherein the electronic system is configured to provide the dynamic media over a computer network.

3. The electronic system of claim 1, wherein the attention-indicative response comprises a cursor movement.

4. The electronic system of claim 1, wherein the attention-indicative response comprises gaze-position, eye movement velocity, pupil size, head movement, hand movement, facial expression, heart rate, breathing effort, galvanic skin response, or a combination of two or more of the foregoing.

5. The electronic system of claim 1, wherein the dynamic media comprises a pre-recorded dynamic media.

6. The electronic system of claim 1, wherein the dynamic media comprises a real-time dynamic media that is broadcast by a broadcaster.

7. The electronic system of claim 1, wherein the dynamic media comprises a dynamic video of a video game, and wherein the electronic system is configured to adjust the video game based on the attention metric.

8. The electronic system of claim 1, wherein the attention-indicative response indicates saccade rate and/or blink rate.

9. The electronic system of claim 1, wherein the anticipated response is pre-determined before the electronic system provides the dynamic media for presentation to the human subject, and represents an attentive response expected to occur when attention is paid to the dynamic media.

10. The electronic system of claim 1, wherein the values of the second data in the second time series of the anticipated response represent respective instances of attentive response expected to occur at different respective time points when attention is paid to the dynamic media at the respective time points.

11. A method to assess human attention, the method comprising:
    providing a dynamic media for presentation to a human subject;
    obtaining, from a non-transitory storage medium, a digitally recorded time course of attention-indicative response for the human subject, wherein the digitally recorded time course of the attention-indicative response is a digital recording of the attention-indicative response of the human subject over time while the dynamic media is being presented to the human subject; and
    determining a level of attention of the human subject to the dynamic media, wherein the level of attention is determined by determining a similarity metric indicating a degree of pattern matching based on a comparison between (i) a first data pattern of the digitally recorded time course of the attention-indicative response and (ii) a second data pattern of a time course of anticipated response to the dynamic media;
    wherein the digitally recorded time course of the attention-indicative response comprises a first time series of first data in which different values of the first data obtained at different respective time points of the dynamic media over a first period of time form the first data pattern;
    wherein the time course of the anticipated response comprises a second time series of second data in which different values of the second data obtained at different respective time points of the dynamic media over a second period of time form the second data pattern; and
    wherein the first data in the first time series and the second data in the second time series form the attention-indicative response and the anticipated response respectively, to the same dynamic media.

12. The method of claim 11, wherein the time course of the anticipated response to the dynamic media is determined by a computer model.

13. The method of claim 11, wherein the time course of the anticipated response to the dynamic media is determined by aggregating responses of human test subjects to the dynamic media.

14. The method of claim 11, wherein the human subject is remote, and the dynamic media is provided over a computer network.

15. The method of claim 14, wherein the attention-indicative response comprises a cursor movement.

16. The method of claim 11, wherein the attention-indicative response comprises gaze-position, eye movement velocity, pupil size, head movement, hand movement, facial expression, heart rate, breathing effort, galvanic skin response, or a combination of two or more of the foregoing.

17. The method of claim 11, wherein the attention-indicative response is recorded using a digital recording device attached to the human subject.

18. The method of claim 11, wherein the dynamic media comprises a pre-recorded dynamic media.

19. The method of claim 11, wherein the dynamic media comprises a real-time dynamic media that is broadcast by a broadcaster.

20. The method of claim 11, wherein the level of attention is the similarity metric.

21. The method of claim 11, wherein the time course of the anticipated response to the dynamic media comprises a median response of a group of human test subjects.

22. The method of claim 11, wherein the dynamic media comprises a dynamic video of a video game, and wherein the method further comprises adjusting the video game based on the attention metric.

23. The method of claim 11, wherein the time course of the anticipated response is based on responses of other human subjects to which the dynamic media is presented.

24. The method of claim 11, wherein the attention-indicative response indicates saccade rate and/or blink rate.

25. The method of claim 11, wherein the anticipated response is pre-determined before the dynamic media is presented to the human subject, and represents an attentive response expected to occur when attention is paid to the dynamic media.

26. The method of claim 11, wherein the values of the second data in the second time series of the anticipated response represent respective instances of attentive response expected to occur at different respective time points when attention is paid to the dynamic media at the respective time points.

27. The method of claim 11, wherein the anticipated response is obtained after the dynamic media is determined, and before the dynamic media is presented to the human subject to determine the time course of the attention-indicative response for the human subject.

* * * * *